(12) United States Patent
Maners et al.

(10) Patent No.: US 12,077,088 B2
(45) Date of Patent: Sep. 3, 2024

(54) PIVOTAL TIE-DOWN

(71) Applicants: Jay R. Maners, Mount Vernon, OH (US); Bryce Maners, Mount Vernon, OH (US)

(72) Inventors: Jay R. Maners, Mount Vernon, OH (US); Bryce Maners, Mount Vernon, OH (US)

(73) Assignee: Maners Mount LLC, Mount Vernon, OH (US)

( * ) Notice: Subject to any disclaimer, the term of this patent is extended or adjusted under 35 U.S.C. 154(b) by 479 days.

(21) Appl. No.: 16/873,593

(22) Filed: May 14, 2020

(65) Prior Publication Data

US 2020/0361363 A1   Nov. 19, 2020

Related U.S. Application Data

(63) Continuation-in-part of application No. 16/873,538, filed on Apr. 30, 2020.

(60) Provisional application No. 62/920,452, filed on Apr. 30, 2019.

(51) Int. Cl.
| | |
|---|---|
| *B60P 7/08* | (2006.01) |
| *A47B 96/02* | (2006.01) |
| *B60P 7/06* | (2006.01) |
| *B62D 33/02* | (2006.01) |
| *F16C 11/04* | (2006.01) |

(52) U.S. Cl.
CPC ............ *B60P 7/0807* (2013.01); *A47B 96/02* (2013.01); *B60P 7/06* (2013.01); *B60P 7/0838* (2013.01); *B62D 33/02* (2013.01); *F16C 11/04* (2013.01); *F16C 2326/00* (2013.01)

(58) Field of Classification Search
CPC ......... F16C 11/04; B62P 7/0807; B62D 33/02
USPC ................... 296/184.1; 410/103, 100, 34, 12
See application file for complete search history.

(56) References Cited

U.S. PATENT DOCUMENTS

| | | | |
|---|---|---|---|
| 337,582 A | 3/1886 | Hildreth | |
| 430,015 A | 6/1890 | Hanlon | |
| 765,152 A | 7/1904 | Stark | |
| 1,675,140 A | 6/1928 | Schenderlein | |
| 2,676,712 A | 4/1954 | Chappory | |
| 2,738,204 A * | 3/1956 | Ibey | B60P 7/083 |
| | | | 410/36 |
| 2,895,617 A | 7/1959 | Orser | |
| 2,895,714 A * | 7/1959 | Clark | B66D 3/02 |
| | | | 254/371 |

(Continued)

*Primary Examiner* — Stephen T Gordon
(74) *Attorney, Agent, or Firm* — Andrew C. Pike

(57) ABSTRACT

A tie-down secures a load onto a vehicle. The tie-down has a pivot, and a winch. The pivot has a pin, a rotatable sleeve, a cap, and a base. The pin is an annular tube. The winch has a U-shaped frame comprising first and second walls, and a third wall interconnecting the first and second walls. Flanges attach the first and second walls, respectively, of the winch to the sleeve. The third wall is perpendicular to the sleeve. The vehicle has a support surface for supporting the load, and a plurality of the tie-downs. The tie-downs comprise left-hand tie-downs and right-hand tie-downs. The tie-downs are attached to shelves attached to the vehicle adjacent and extending away from the support surface. The shelves comprise left-hand shelves and right-hand shelves. Alternatively, anchors are attached to the tie-downs for removably mounting the tie-downs within stake pockets of the vehicle.

40 Claims, 14 Drawing Sheets

(56) References Cited

U.S. PATENT DOCUMENTS

| | | | |
|---|---|---|---|
| 2,991,975 A * | 7/1961 | Alexander | B66D 1/04 |
| | | | 410/103 |
| 3,118,171 A | 1/1964 | Parsons | |
| 3,130,688 A * | 4/1964 | Gutridge | B60F 1/00 |
| | | | 280/6.151 |
| 3,240,473 A | 3/1966 | Coffey et al. | |
| 3,508,502 A * | 4/1970 | Sims | B61D 45/003 |
| | | | 410/103 |
| 3,697,045 A | 10/1972 | Farley | |
| 3,825,973 A * | 7/1974 | Gwozdz | E05F 1/1215 |
| | | | 16/300 |
| 3,877,671 A * | 4/1975 | Underwood | B61D 45/002 |
| | | | 410/97 |
| 4,319,792 A | 3/1982 | Britt et al. | |
| 4,360,300 A | 11/1982 | Nadherny et al. | |
| 4,373,841 A | 2/1983 | Adler et al. | |
| 4,458,881 A | 7/1984 | Jones et al. | |
| 4,511,122 A | 4/1985 | Svendsen | |
| 4,808,875 A | 2/1989 | Edwards | |
| 4,842,458 A | 6/1989 | Carpenter | |
| 4,958,875 A | 9/1990 | Zamzow | |
| 5,005,256 A | 4/1991 | Jang | |
| 5,186,410 A | 2/1993 | Toews | |
| 5,664,918 A * | 9/1997 | Heider | B60P 7/083 |
| | | | 410/104 |
| 5,775,664 A | 7/1998 | Martin | |
| 5,899,646 A * | 5/1999 | Tatina | B61D 45/001 |
| | | | 410/97 |
| 6,209,942 B1 | 4/2001 | French | |
| 6,350,088 B1 | 2/2002 | Priester | |
| 6,523,806 B2 | 2/2003 | Bartal | |
| 6,527,487 B2 | 3/2003 | Adams | |
| 6,558,092 B1 * | 5/2003 | Woodruff | B61D 45/001 |
| | | | 410/23 |
| 6,565,301 B1 | 5/2003 | Lin | |
| 6,626,621 B1 | 9/2003 | Hugg | |
| 7,160,069 B2 | 1/2007 | Adams | |
| 7,464,916 B1 | 12/2008 | Drinkhorn | |
| 7,857,000 B1 | 12/2010 | Langdon | |
| 7,857,560 B2 * | 12/2010 | Leggett | B60P 7/0861 |
| | | | 410/103 |
| 8,075,424 B1 | 12/2011 | Hostetler | |
| 8,690,502 B1 | 4/2014 | Huang | |
| 9,016,990 B2 | 4/2015 | Grone | |
| 9,884,580 B2 * | 2/2018 | Hemphill | B60P 7/0807 |
| 2003/0039526 A1 * | 2/2003 | Yuan | B60P 7/0807 |
| | | | 410/107 |
| 2010/0066070 A1 | 3/2010 | Scott-Greavu | |
| 2017/0113595 A1 * | 4/2017 | Hemphill | B60P 7/0853 |

\* cited by examiner

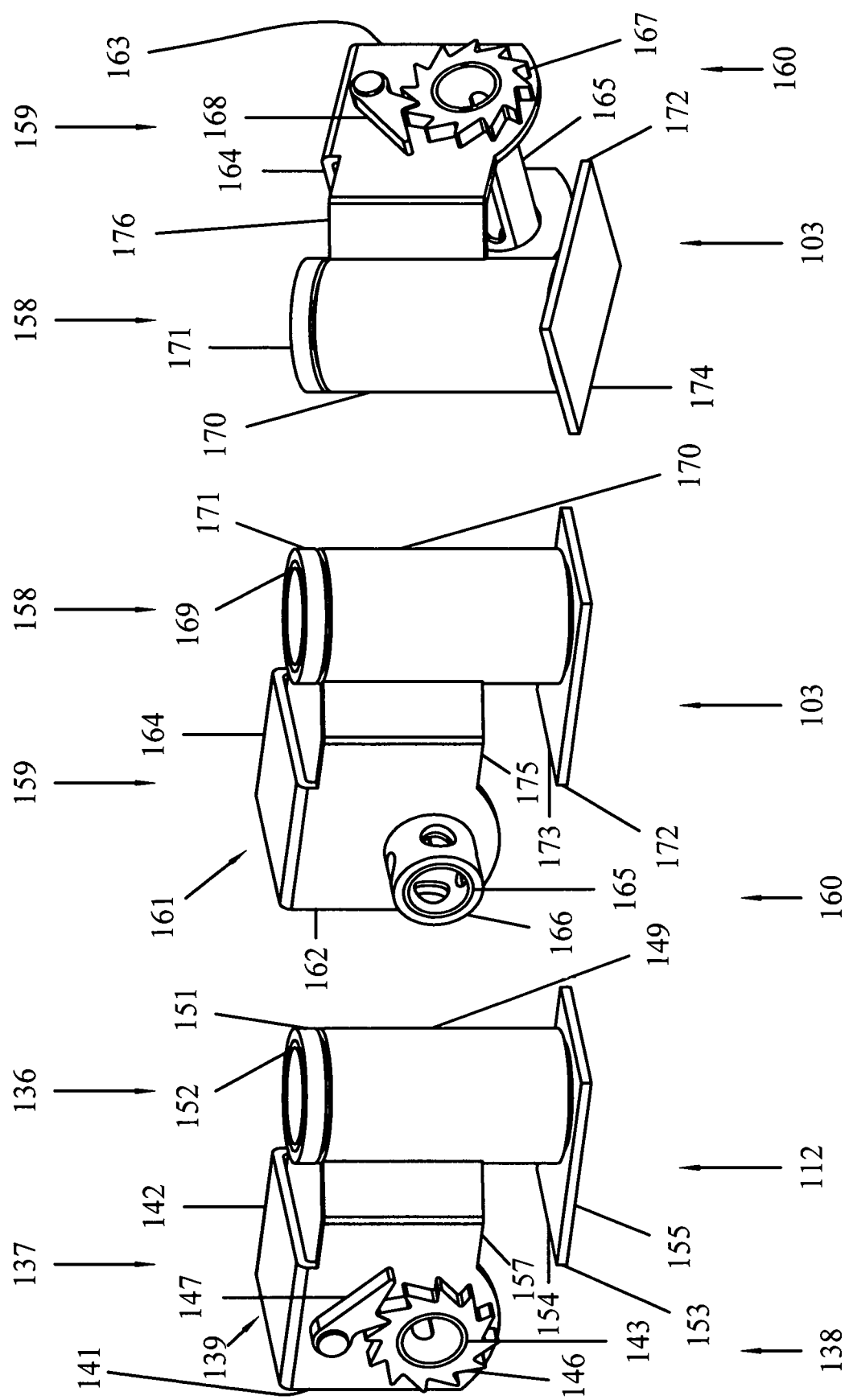

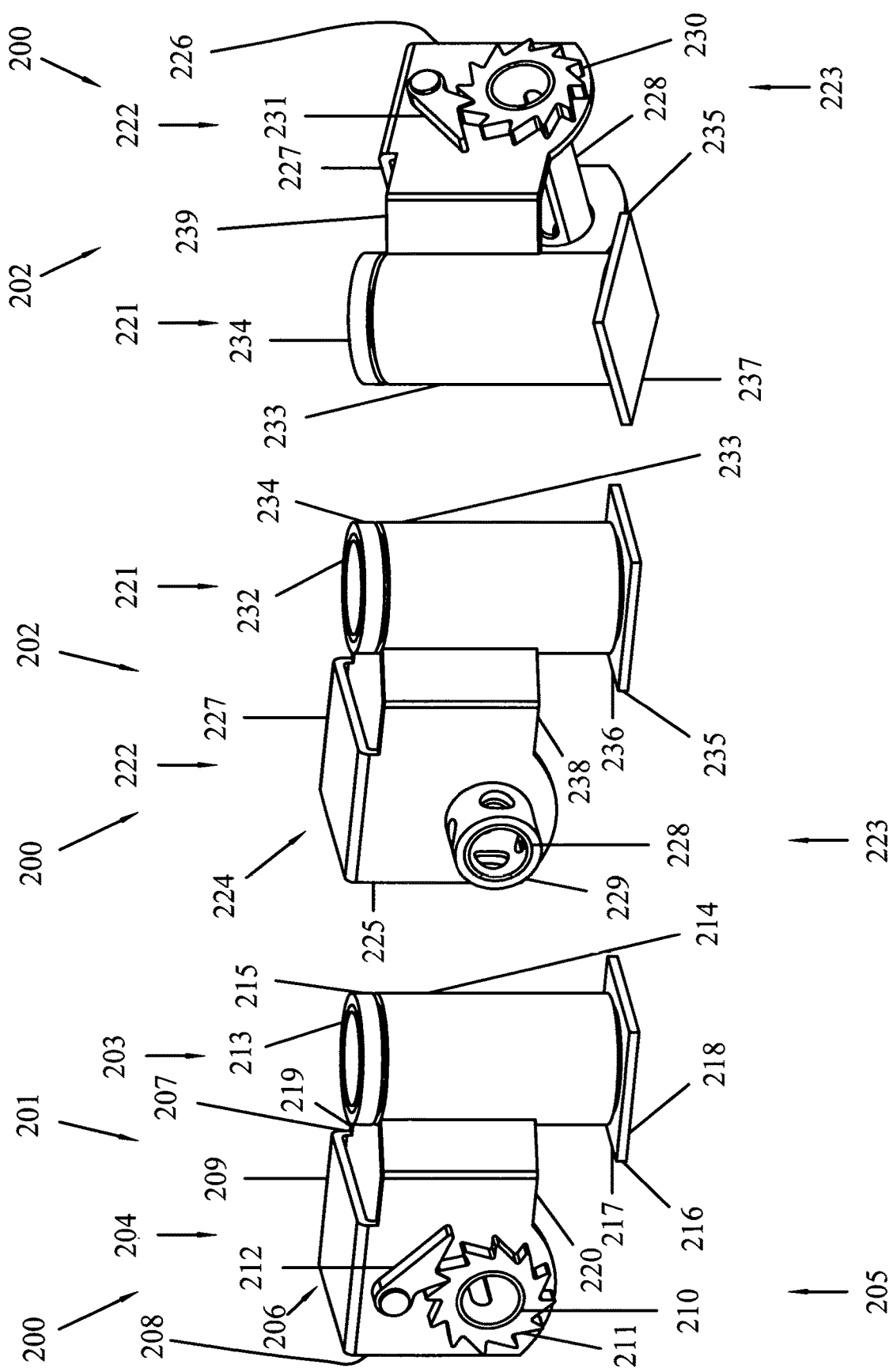

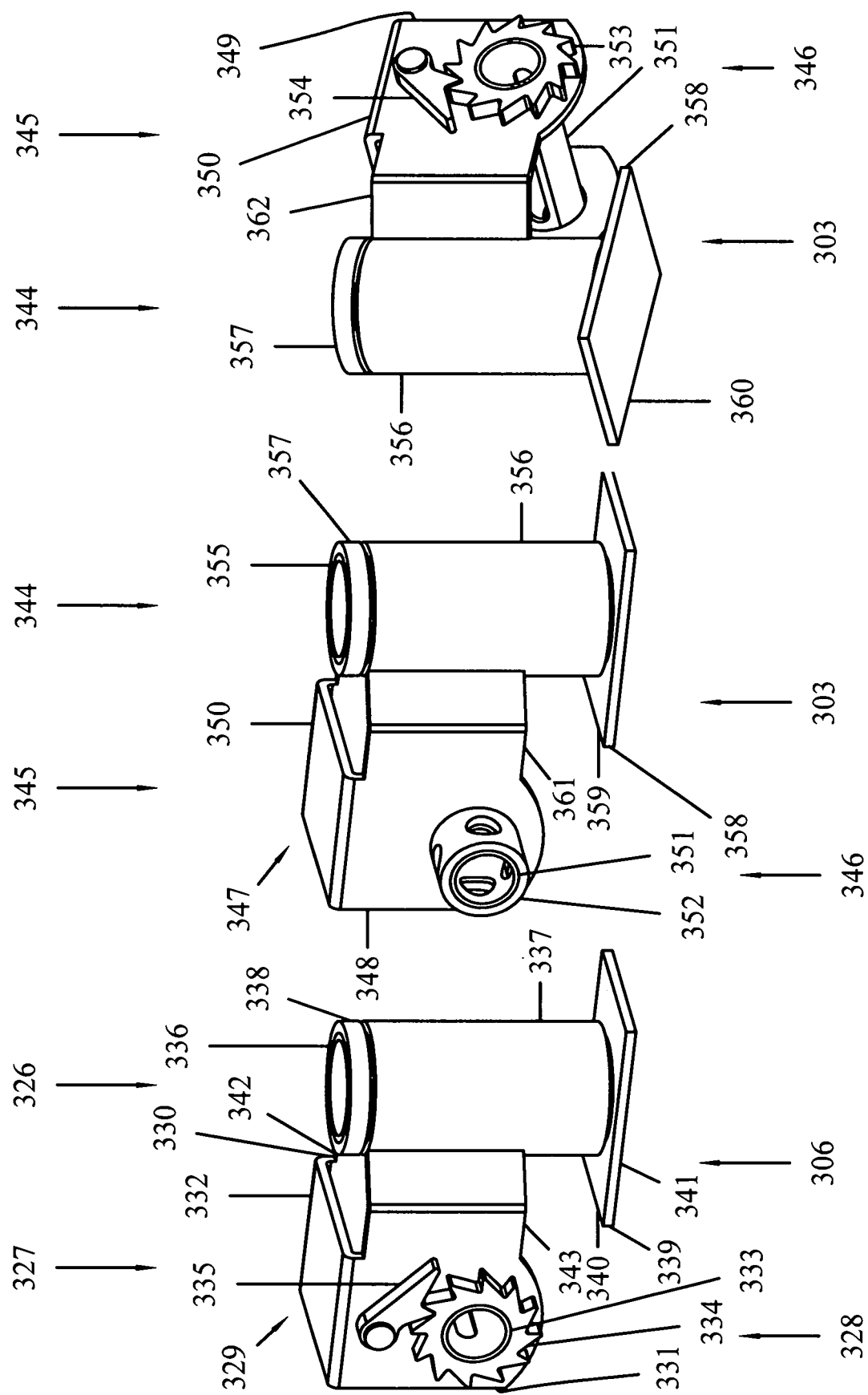

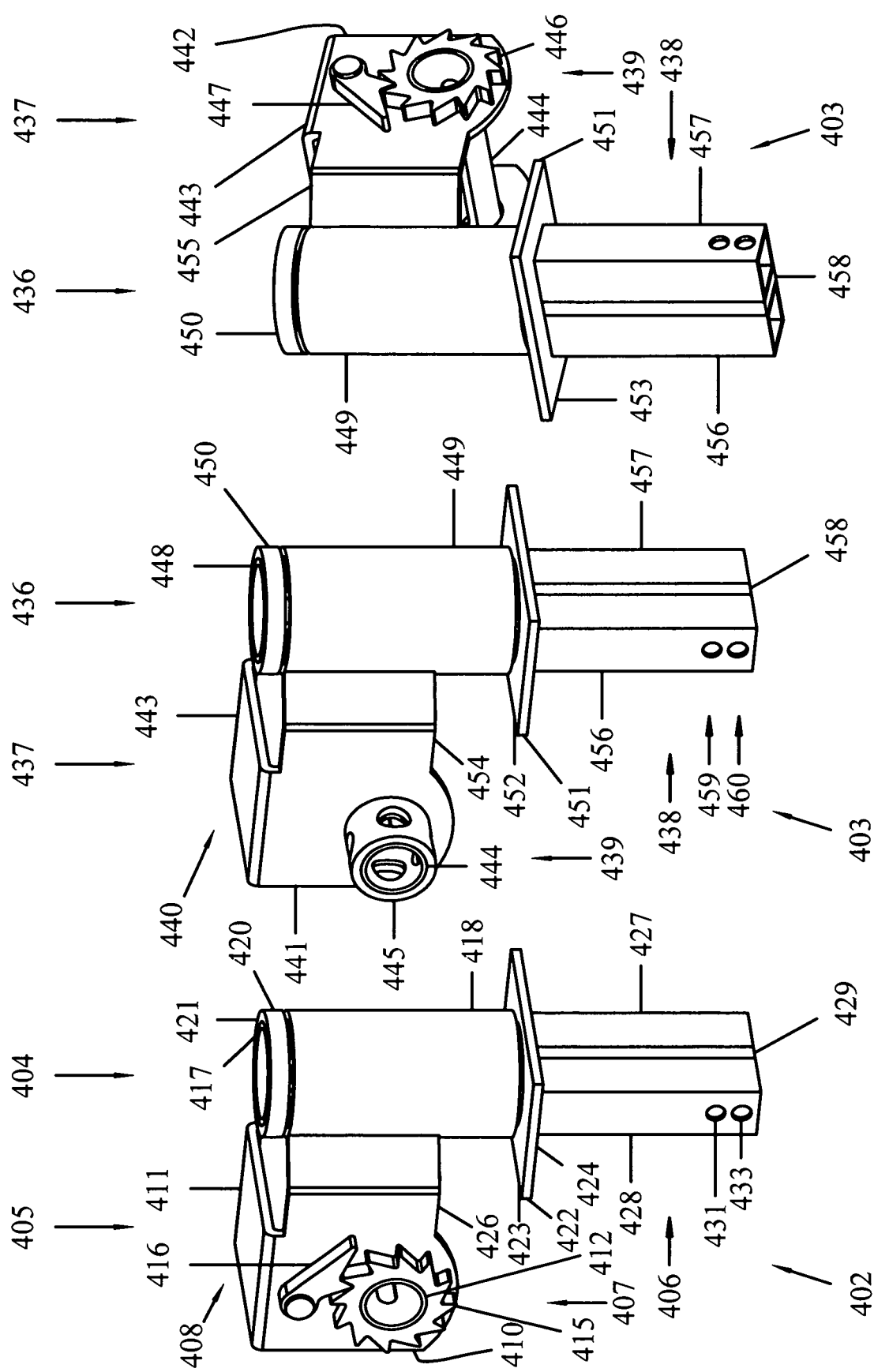

PIVOTAL TIE-DOWN

CROSS-REFERENCE TO RELATED APPLICATIONS

This application is a continuation-in-part of application Ser. No. 16/873,538 filed Apr. 30, 2020, which claims the benefit of provisional application No. 62/920,452 filed Apr. 30, 2019, both of which are incorporated by reference.

BACKGROUND OF THE INVENTION

Field of the Invention

The present invention relates to tie-downs for securing a load on a support surface of a vehicle for when the vehicle is transporting the load.

Background Art

Loads that are transported by vehicles must be secured on or in the vehicle to prevent damage to the load, to the vehicle, and to others due to an unintentional movement of the load relative to the vehicle or partial shifting off of the load from the vehicle or complete dislodgement and falling off of the load from the vehicle during the transporting thereof; and there exist legal requirements to enforce this prevention.

Specifically in the field of transportation, tie-downs are commonly used to so secure loads. However, these tie-downs or components thereof can be readily misplaced. Particularly in the business of equipment rental, auxiliary and supplemental tools such as tie-downs and/or their separate components are too often misplaced, lost, or stolen. Hence, securing the tie-downs themselves would reduce their loss.

Further, some tie-downs can be overly complex. Their deployment and operation to successfully secure a load on a vehicle consumes much time where speedy loading and unloading is a high priority. A tie-down system that reduces the time necessary to fully secure a load on a vehicle would yield faster delivery of the load; and particularly for equipment rental, would increase overall productivity.

Furthermore, some tie-downs can be overly restrictive in relation to the width of the load to be transported, the width of the transporting vehicle, and the width between deployed tie-downs. A tie-down system that accepts wider loads would result in greater utility of a transporting vehicle, again increasing overall productivity with respect to the transporting vehicle.

Also, greater flexibility of deployment of the tie-downs of a tie-down system would also speed loading and unloading of a load on a transporting vehicle.

SUMMARY OF THE INVENTION

An objective of the present invention is to secure a load on a support surface of a vehicle for transporting the load by the vehicle.

Another objective is to quickly so secure the load on the support surface of the transporting vehicle.

Another objective is to mount the tie-downs at wider spacings to permit wider loads on the transporting vehicle.

Another objective is to reduce interference for a hand tool when rewinding the tie-downs.

Another objective is to selectively mount any number of tie-downs to so secure the load as is necessary.

Another objective is to prevent the loss of the tie-downs from the transporting vehicle.

Another objective is to have less waste of production material of the manufacturing of tie-downs.

These and further objectives are met by the present invention, which is contemplated to encompass the subject matter as claimed herein, that has been described and also shown in the accompanying drawings, and the equivalents that are consonant therewith.

The present invention comprises a tie-down, a tie-down system, a pivot, a shelf, a shelf system, and a vehicle for transporting a load comprising any of the tie-down, the tie-down system, the pivot, the shelf, and the shelf system.

The tie-down comprises the pivot, a winch, and flanges attached to both the winch and the pivot. The tie-down system comprises a plurality of tie-downs comprising at least one left-hand tie-down and at least one right-hand tie-down.

The pivot comprises a pin, a rotatable sleeve on the pin, a cap, and a base. The pin comprises a generally annular tube. The cap comprises a ring on the pin. The base comprises a plate on the pin. In one embodiment the pin is attached off-centered to one surface of the plate of the base. In other embodiments the pin is attached centered to the one surface of the plate of the base. In other embodiments the plate of the base is rectangular where the lengths of the sets of the sides are unequal. In yet another embodiment the plate of the base is generally square wherein the lengths of the sides are equal.

The flanges of the tie-down are attached to respective walls of the winch and the sleeve of the pivot. The winch comprises a U-shaped frame comprising a first wall, a second wall, and a third wall, and a spindle rotatably mounted on the first and second walls. The third wall is perpendicular to the sleeve of the pivot. The third wall is spaced from the sleeve.

The left-hand tie-down comprises a left-hand winch that is counterclockwise with respect to the surface, to which the pin is attached, of the base of the pivot thereof. The right-hand tie-down comprises a right-hand winch that is clockwise with respect to the surface, to which the pin is attached, of the base of the pivot thereof.

In another embodiment the tie-downs each comprises an anchor. The anchor comprises first and second generally annular tubes parallel with each, and a generally solid bar, wherein the tubes sandwich the bar. The anchor has a set of locking holes. In another embodiment the anchor is attached off-centered to the base of the respective pivot.

The shelf comprises a channel having a surface for supporting an object. The shelf comprises a proximal side, a distal side, and first and second extending sides interconnecting the proximal side and the distal side. In one embodiment the extending sides have equal lengths, and the proximal and distal sides are parallel with each other. In another embodiment the extending sides have unequal lengths, and the proximal and distal sides are not parallel with each other.

The shelf system comprises a plurality of shelves comprising at least one left-hand shelf and at least one right-hand shelf. The left-hand shelf comprises the proximal side, the first extending side, the distal side, and the second extending side counterclockwise. The right-hand shelf comprises the proximal side, the first extending side, the distal side, and the second extending side clockwise.

The vehicle for transporting a load comprises a support surface and a plurality of tie-downs for securing the load on the support surface for when the vehicle is transporting the load. The tie-downs comprise at least one left-hand tie-down and at least one right-hand tie-down. In one embodiment the vehicle also comprises shelves for supporting the tie-downs. The shelves are attached to the vehicle adjacent the support surface and extend outwardly away from the support surface. Each tie-down is attached to one shelf, respectively. The shelf system comprises a plurality of shelves comprising at least one left-hand shelf and at least one right-hand shelf. Each of the left-hand shelves and the right-hand shelves is attached to the vehicle adjacent the support surface and extends outwardly away from the support surface. In another embodiment the vehicle also comprises stake pockets. Anchors of the tie-downs removably mount the tie-downs within the stake pockets, respectively.

BRIEF DESCRIPTION OF THE DRAWINGS

FIG. 1 is a perspective view of one embodiment of the present invention showing a right-hand tie-down thereof.

FIG. 2 is a perspective view of this one embodiment of the present invention showing a left-hand tie-down thereof.

FIG. 3 is another perspective view of the embodiment of the present invention, as shown in FIG. 2.

FIG. 11 is a perspective view of another embodiment of the present invention showing a right-hand tie-down thereof.

FIG. 12 is a perspective view of this other embodiment of the present invention showing a left-hand tie-down thereof.

FIG. 13 is another perspective view of the embodiment of the present invention, as shown in FIG. 12.

FIG. 14 is a perspective view of yet another embodiment of the present invention showing a right-hand tie-down thereof.

FIG. 15 is a perspective view of this yet other embodiment of the present invention showing a left-hand tie-down thereof.

FIG. 16 is another perspective view of the embodiment of the present invention, as shown in FIG. 15.

FIG. 20 is a perspective view of still another embodiment of the present invention showing a right-hand tie-down thereof.

FIG. 21 is a perspective view of this still other embodiment of the present invention showing a left-hand tie-down thereof.

FIG. 22 is another perspective view of the embodiment of the present invention, as shown in FIG. 21.

DETAILED DESCRIPTION OF THE INVENTION

Figure 4:
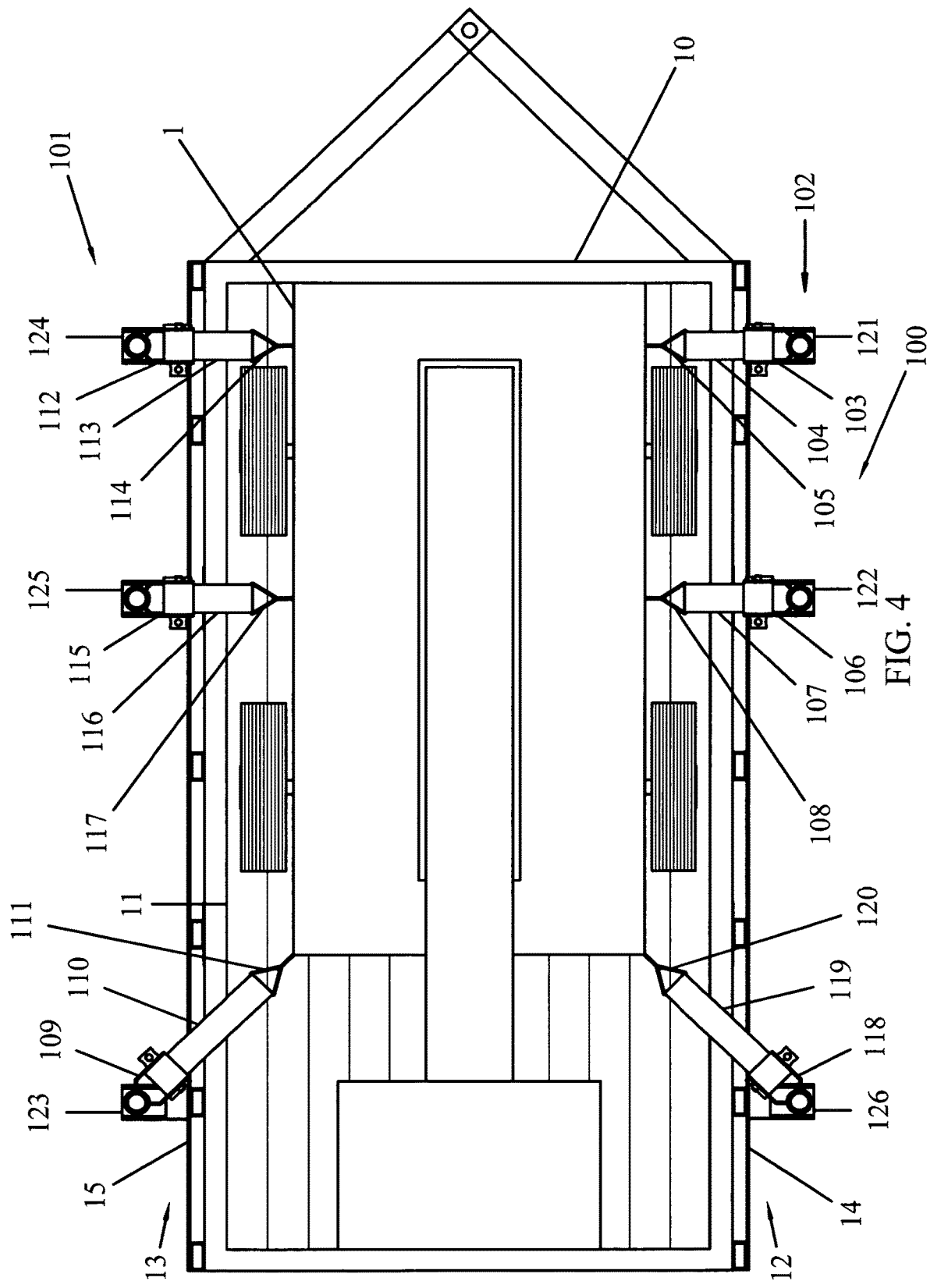
FIG. 4 is a top view of the embodiment of the present invention, as shown in FIG. 1 through FIG. 3, wherein a plurality of left-hand tie-downs and right-hand tie-downs are attached to a plurality of support shelves which are attached to a trailer adjacent to the cargo bed thereof securing a load thereon.

One embodiment of the present invention is shown in FIG. 4 as, generally, a system 100 for securing a load 1 to a vehicle 10 that is for transporting the load 1. The vehicle 10 has a support surface 11 for supporting the load 1 when the vehicle 10 is transporting the load 1. The vehicle 10 further has sets 12 and 13 of spaced-apart stake pockets adjacent to the sides of the support surface 11. Side rails 14 and 15 are attached to the sets 12 and 13 of the stake pockets, respectively, spacing the side rails 14 and 15 from the sides of the support surface 11. The sets 12 and 13 of the stake pockets are between the side rails 14 and 15 and the sides of the support surface 11, respectively. Although the vehicle 10 in FIG. 4 is shown specifically as a trailer, the present invention is contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

The securing system 100 comprises a tie-down system 101 and a shelf system 102. The tie-down system 101 comprises a plurality of tie-downs 103, 106, 109, 112, 115, and 118 that secure the load 1 to the support surface 11 of the vehicle 10. The shelf system 102 comprises a plurality of shelves 121, 122, 123, 124, 125, and 126 that are attached to the vehicle 10 for supporting the plurality of the tie-downs 103, 106, 109, 112, 115, and 118, respectively. Each tie-down 103, 106, 109, 112, 115, and 118 includes a strap 104, 107, 110, 113, 116, and 119 and an attachment 105, 108, 111, 114, 117, and 120, as a hook, respectively. The straps 104, 107, 110, 113, 116, and 119 and the attachments 105, 108, 111, 114, 117, and 120 are known in the art. The tie-downs 103, 106, 109, 112, 115, and 118 engage the load 1, as by directly connecting the attachments 105, 108, 111, 114, 117, and 120 to the load 1 as shown in FIG. 4, and then secure the load 1 on the support surface 11 by tightening the straps 104, 107, 110, 113, 116, and 119 with the tie-downs 103, 106, 109, 112, 115, and 118.

While six tie-downs 103, 106, 109, 112, 115, and 118 supported on six shelves 121, 122, 123, 124, 125, and 126 are specifically shown in FIG. 4, the present invention is contemplated to be used, at least, with any number of the tie-downs of the tie-down system 101 on at least a like number of the shelves of the shelf system 102 so as to secure the load 1 onto the support surface 11 of the vehicle 10 to prevent the load 1 from unintentionally moving relative to the support surface 11 during the transporting thereof.

The shelves 121, 122, 123, 124, 125, and 126 of the shelf system 102 are attached to the vehicle 10 adjacent to the support surface 11 as shown in FIG. 4. Each shelf 121, 122, 123, 124, 125, and 126 extends outwardly away from the support surface 11. Each shelf 121, 122, 123, 124, 125, and 126 supports one of the tie-downs 103, 106, 109, 112, 115, and 118, respectively, when the tie-down thereof is attached thereto, as by welding. Each tie-down 103, 106, 109, 112, 115, and 118 is attached to the respective shelf 121, 122, 123, 124, 125, and 126 preferably adjacent the distal side of the respective shelf 121, 122, 123, 124, 125, and 126. The tie-downs 103, 106, 109, 112, 115, and 118 are thus spaced widely apart transversely with respect to the support surface 11 of the vehicle 10 to accommodate wider loads, preferably up to the maximum width possible and permissible for the support surface 11 and for the vehicle 10, for transporting the wider loads with the vehicle 10.

The shelves 121, 122, 123, 124, 125, and 126 are identical with each other; and, as such, the shelf 121 is typical. The shelf 121 is shown in greater detail in FIG. 5 and FIG. 6.

Figure 5:
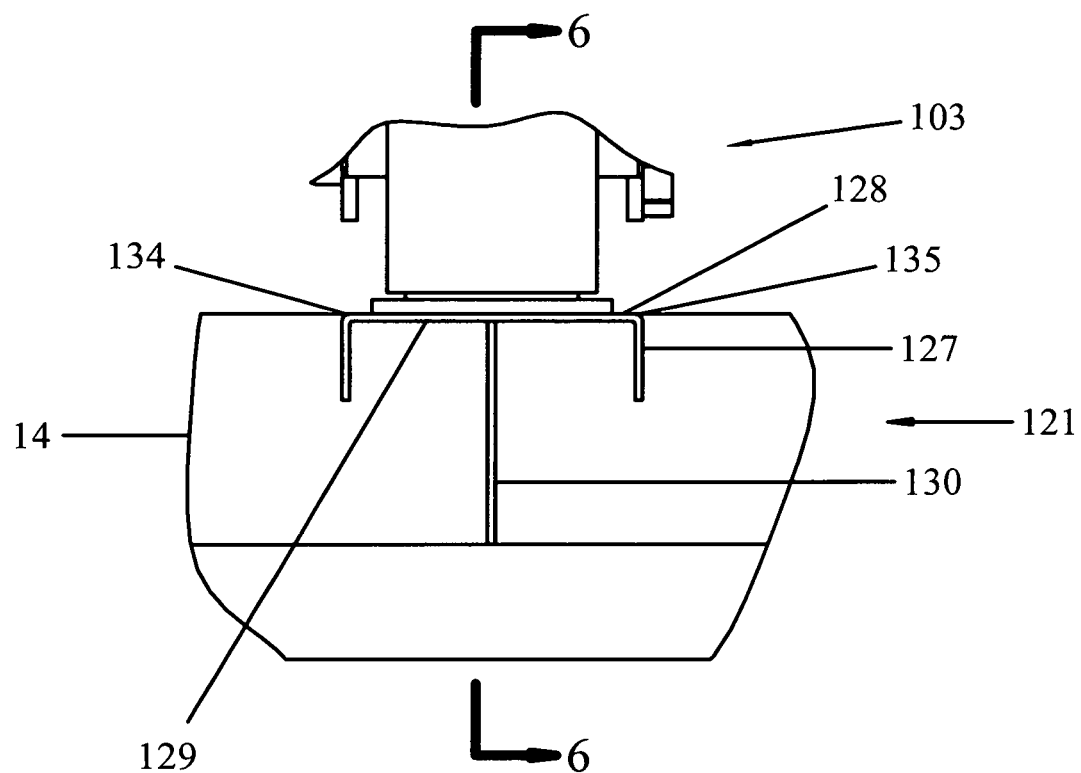
FIG. 5 is an end view, partly broken, of the embodiment of the present invention, as shown in FIG. 4, of one support shelf.
Figure 6:
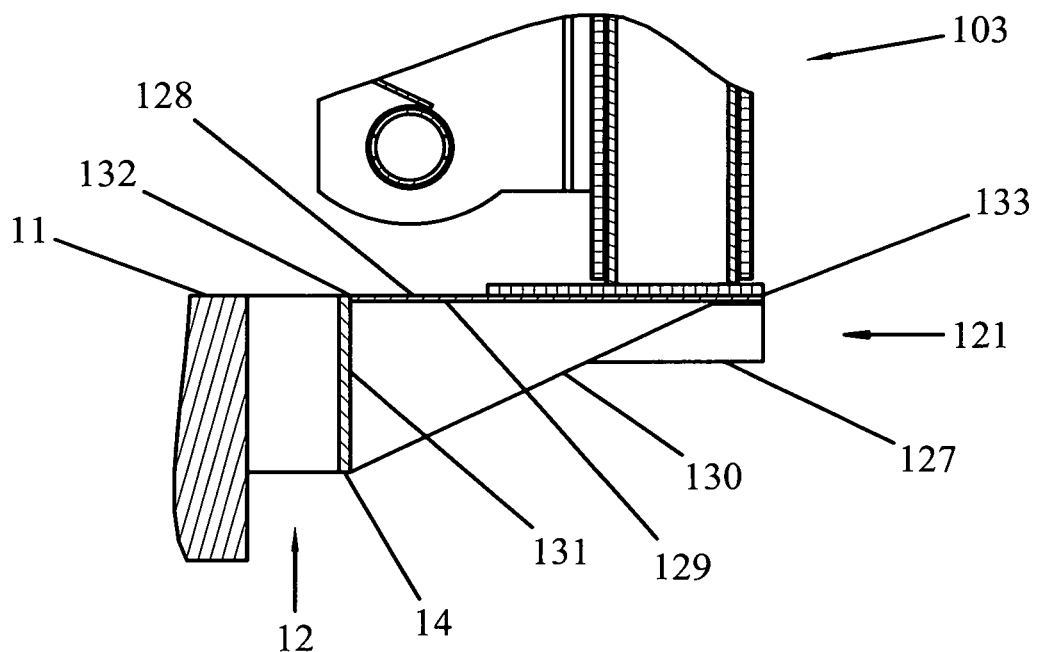
FIG. 6 is a cross-sectional view, partly broken, taken on line 6-6 in FIG. 5.

The shelf 121 is a channel 127 that is cross-sectionally generally C-shaped. The C-shaped channel 127 has a surface 128 for supporting the tie-down 103. The C shape of the channel 127 opens outwardly opposite to the surface 128 as shown in FIG. 5. The tie-down 103 is attached, as by welding, to the surface 128. The C-shaped channel 127 also has an undersurface 129. A generally triangularly shaped gusset 130 is attached, as by welding, to the undersurface 129, preferably midway along the undersurface 129. The gusset 130 has a proximal end 131, and is shorter than the C-shaped channel 127 as shown in FIG. 6. The C-shaped channel 127 and the gusset 130 are each made of suitable structural material, as metal.

The C-shaped channel 127 of the shelf 121 has a proximal side 132, a distal side 133 opposite from and parallel with the proximal side 132, and a first extending side 134 and a second extending side 135 interconnecting the proximal side 132 and the distal side 133. The first and second extending sides 134 and 135 are parallel with each other, and each has a length defined between the proximal side 132 and the distal side 133. The lengths of the first and second extending sides 134 and 135 are equal.

The proximal end 131 of the gusset 130 is aligned with the proximal side 132 of the C-shaped channel 127. The shelf 121 is attached, as by welding, at the proximal side 132 and at the proximal end 131 to the side rail 14 of the vehicle 10 adjacent to the support surface 11 of the vehicle 10. The gusset 130 thus interconnects the C-shaped channel 127 and the vehicle 10. The shelf 121 extends outwardly away from the support surface 11 from the proximal side 132 to the distal side 133. The surface 128 of the C-shaped channel 127 of the shelf 121 is generally level with the support surface 11 of the vehicle 10.

The plurality of the tie-downs of the tie-down system 101 comprises a plurality of left-hand tie-downs 103, 106, and 109 and a plurality of right-hand tie-downs 112, 115, and 118 as shown in FIG. 4. Each left-hand tie-down 103, 106, and 109 and each right-hand tie-down 112, 115, and 118 is attached to the shelves thereof 121, 122, and 123 and 124, 125, and 126, respectively, so that a person rotating the left-hand tie-downs 103, 106, and 109 and the right-hand tie-downs 112, 115, and 118 to secure the load 1 on the support surface 11 by tightening the straps 104, 107, and 110 and 113, 116, and 119, respectively, is positioned along the sides of the support surface 11 towards the center of the vehicle 10. Therefore, the person is always on the left-hand side of any left-hand tie-down 103, 106, and 109, and is always on the right-hand side of any right-hand tie-down 112, 115, and 118. Thus, on the right-hand side of the vehicle 10, adjacent to the side rail 14, the left-hand tie-down 103 is near the front right corner of the support surface 11 of the vehicle 10 and the right-hand tie-down 118 is near the rear right corner of the support surface 11 of the vehicle 10. On the left-hand side of the vehicle 10, adjacent the side rail 15, the right-hand tie-down 112 is near the front left corner of the support surface 11 of the vehicle 10 and the left-hand tie-down 109 is near the rear left corner of the support surface 11 of the vehicle 10. Tie-downs that are next closer towards the center along the sides of the vehicle 10 from the corners of the support surface 11 are likewise left-hand tie-downs or right-hand tie-downs as are the tie-downs nearest the corners. Thus, in FIG. 4, the tie-down 106 is specifically shown as the left-hand tie-down 106, and the tie-down 115 is specifically shown as the right-hand tie-down 115. At or near the center along the sides of the vehicle 10, the tie-downs of the tie-down system 101 may be either a left-hand tie-down or a right-hand tie-down.

The right-hand tie-downs 112, 115, and 118 are identical with each other, and the left-hand tie-downs 103, 106, and 109 are identical with each other; and the left-hand tie-downs are generally the same as the right-hand tie-downs except for being left-hand for right-hand as described and shown herein. As such, the right-hand tie-down 112 is typical of the right-hand tie-downs 112, 115, and 118, and is shown in greater detail in FIG. 1 and FIG. 7, FIG. 8, FIG. 9, and FIG. 10. The left-hand tie-down 103 is typical of the left-hand tie-downs 103, 106, and 109, and is shown in greater detail in FIG. 2 and FIG. 3.

The right-hand tie-down 112 has a pivot 136, and a right-hand winch 137. The pivot 136 and the right-hand winch 137 are each made of suitable structural material, as metal. The right-hand winch 137 may be a hand winch 138 as shown. The right-hand winch 137 has a generally U-shaped frame 139. The U-shaped frame 139 has a first wall 140, a second wall 141, and a third wall 142. The first wall 140 and the second wall 141 extend generally perpendicularly from the third wall 142, and the third wall 142 interconnects the first wall 140 and the second wall 141 at proximal ends thereof, thus defining the U shape. The first wall 140 and the second wall 141 have distal ends opposite from both the proximal ends thereof and the third wall 142.

Figures 7, 8:
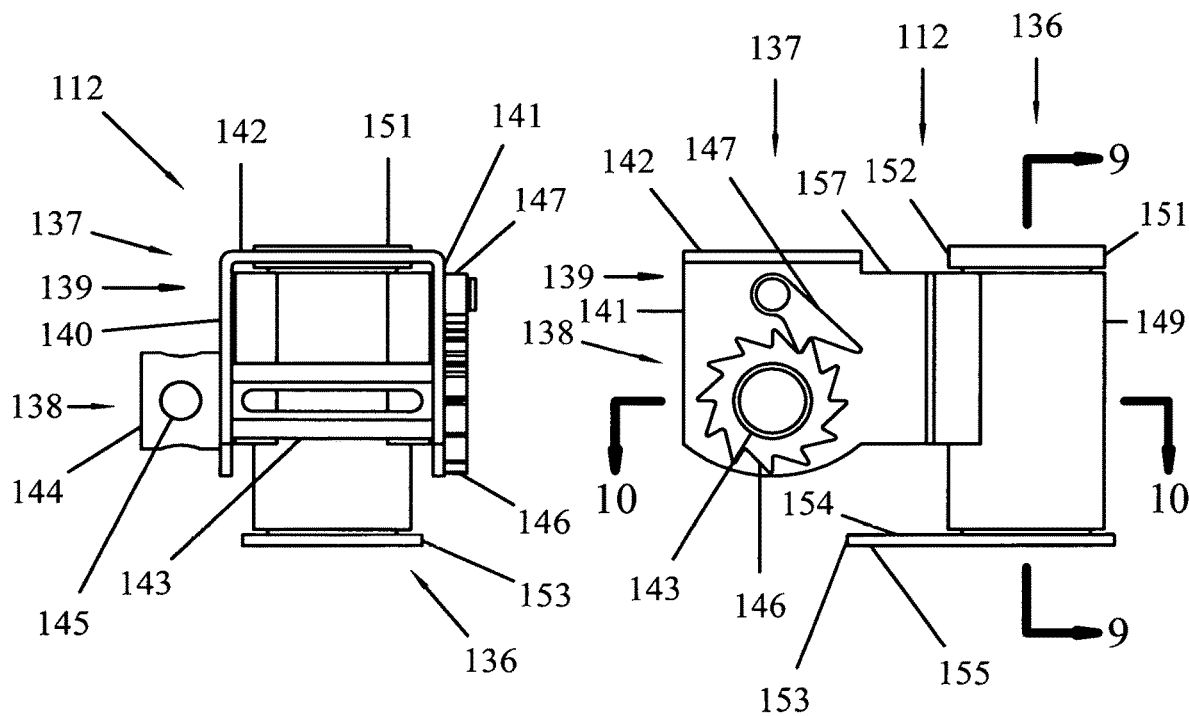
FIG. 7 is a view of the embodiment of the present invention, as shown in FIG. 1, facing the winch of the right-hand tie-down.
FIG. 8 is a side view of the embodiment of the present invention, as shown in FIG. 7.

The first wall 140 and the second wall 141 each has an aperture therein. Rotatably mounted within the apertures is a spindle 143 having a first end extending beyond the outer surface of the first wall 140, and a second end extending beyond the outer surface of the second wall 141. The strap 113 is removably attachable to the spindle 143, as by engagement slots in the spindle 143, so as to be wound and unwound on the spindle 143. Shown as the hand winch 138, the first end of the spindle 143 has a crank 144 attached thereto, as by welding, adjacent to the outer surface of the first wall 140. The crank 144 and the first end of the spindle 143 have engagement holes 145 for receiving a hand tool (not shown) for rotating the spindle 143. The second end of the spindle 143 has a ratchet 146 attached thereto, as by welding, adjacent to the outer surface of the second wall 141. A pawl 147 is mounted, as on a post, on the outer surface of the second wall 141 to swivel between a locking position engaging with the ratchet 146 to prevent the ratchet 146 and the spindle 143 from unwinding, and as shown in FIG. 8 in the counterclockwise direction relative to the ratchet 146, and an open position whereby the ratchet 146 and the spindle 143 may rotate freely in either direction.

The pivot 136 has a pin 148 and a generally circularly annular sleeve 149 rotatably mounted on the pin 148. The pin 148 is a generally circularly annular tube 150. The annular tube 150 is longer than the rotatable sleeve 149, and has first and second ends and an outer surface interconnecting the first and second ends. A cap 151, as a first cap, is attached, as by welding, to the annular tube 150. The cap 151 is a generally circularly annular ring 152 attached onto the outer surface of the annular tube 150 adjacent to the first end thereof. The ring 152 has a minimum transverse outer dimension, as a diameter as shown, that is equal to or greater than the maximum transverse dimension, as a diameter as shown, of the rotatable sleeve 149.

A base 153, as a second cap, is attached, as by welding, to the annular tube 150 on the second end thereof. The base 153 is a plate. The plate of the base 153 has two opposite side surfaces 154 and 155. The second end of the annular tube 150 is attached off-centered to the one side surface 154 of the plate of the base 153. The one side surface 154 is thus proximal to the rotatable sleeve 149, and the other, opposite side surface 155 is distal from the rotatable sleeve 149. The plate of the base 153 has transverse dimensions that are unequal transverse width and transverse length, greater than the transverse width, as shown in FIG. 1 and FIG. 7 through FIG. 10. The plate of the base 153 is thus rectangular, with the transverse width thereof defining a first set of sides having one same length and the transverse length thereof defining a second set of sides having one same length such that the lengths of the first set are unequal to the lengths of the second set of the rectangle of the plate of the base 153. The transverse dimensions of the base 153 are greater than the maximum transverse dimension, as a diameter as shown, of the rotatable sleeve 149.

The cap 151 and the base 153 thereby capture the rotatable sleeve 149 onto the pin 148 for the rotatable sleeve 149 to freely rotate on the pin 148 about an axis of rotation. The axis of rotation is aligned with the lengths of both the pin 148 and the rotatable sleeve 149.

A first flange 156 is attached, as by welding, to both the first wall 140 of the right-hand winch 137 and the rotatable sleeve 149 interconnecting the first wall 140 and the rotatable sleeve 149, and a second flange 157 is attached, as by welding, to both the second wall 141 of the right-hand winch 137 and the rotatable sleeve 149 interconnecting the second wall 141 and the rotatable sleeve 149. The one side surface 154 of the base 153 is thus proximal to the right-hand winch 137, and the opposite side surface 155 is distal from the right-hand winch 137. The right-hand winch 137 of the right-hand tie-down 112 is pivotal in either direction about the axis of rotation of the rotatable sleeve 149 of the pivot 136.

Figure 10:
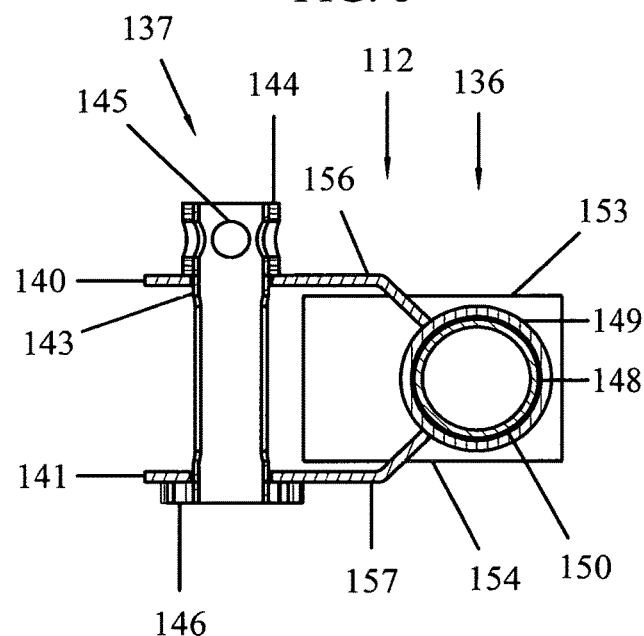
FIG. 10 is a cross-sectional view taken on line 10-10 in FIG. 8.

As shown particularly in FIG. 1, FIG. 8, and FIG. 10, the right-hand winch 137 is clockwise with respect to the one side surface 154 of the base 153. The crank 144 is acutely clockwise from the second wall 141, in that the clockwise angle from the second wall 141 to the crank 144 is acute. The ratchet 146 and the spindle 143 wind in the clockwise direction which the pawl 147 permits when the pawl 147 is in the locking position. When the right-hand winch 137 is pivoting clockwise then the crank 144 is leading and the ratchet 146 is following.

The flanges 156 and 157 space the U-shaped frame 139, and the first wall 140, the second wall 141, and the third wall 142 of the U-shaped frame 139, from the rotatable sleeve 149. The third wall 142 is perpendicular to the rotatable sleeve 149, in that the third wall 142, although spaced from the rotatable sleeve 149, extends by projection radially outwardly away from the axis of rotation of the rotatable sleeve 149 as shown in FIG. 1. The first wall 140 and the second wall 141 extend parallel with the axis of rotation of the rotatable sleeve 149 as shown in FIG. 1. Thus, the U-shaped frame 139 has the U shape thereof opening spaced from the axis of rotation of the rotatable sleeve 149, and parallel with the axis of rotation of the rotatable sleeve 149 in the direction of from the cap 151 to the base 153.

The opposite side surface 155 of the base 153 of the pivot 136 is attached, as by welding, to the surface, for supporting the right-hand tie-down 112, of the C-shaped channel of the shelf 124 as shown in FIG. 4. The shelf 124 attaches the right-hand tie-down 112 to the vehicle 10 so that the axis of rotation of the rotatable sleeve 149 is generally perpendicular to the support surface 11 to angularly position the right-hand winch 137 by pivoting the right-hand winch 137 to any plane angle about the axis of rotation relative to the support surface 11, and preferably, when the axis of rotation is generally vertical, that the right-hand winch 137 is pivotal to any angle horizontally.

The left-hand tie-down 103 has, identically as the right-hand tie-down 112 has, a pivot 158, and a left-hand winch 159, each made of suitable structural material, as metal. The left-hand winch 159 may be a hand winch 160 as shown in FIG. 2 and FIG. 3. The left-hand winch 159 has a generally U-shaped frame 161 comprising a first wall 162, a second wall 163, and a third wall 164. The first wall 162 and the second wall 163 extend from the third wall 164, and the third wall 164 interconnects the first wall 162 and the second wall 163 at proximal ends thereof, thus defining the U shape. Rotatably mounted within apertures in the first wall 162 and the second wall 163 is a spindle 165 having a first end extending beyond the outer surface of the first wall 162, and a second end extending beyond the outer surface of the second wall 163. The strap 104 is removably attachable to the spindle 165, as by engagement slots in the spindle 165, so as to be wound and unwound on the spindle 165. Shown as the hand winch 160, the first end of the spindle 165 has a crank 166 attached thereto, as by welding, adjacent to the outer surface of the first wall 162. The crank 166 and the first end of the spindle 165 have engagement holes for receiving a hand tool (not shown) for rotating the spindle 165. The second end of the spindle 165 has a ratchet 167 attached thereto, as by welding, adjacent to the outer surface of the second wall 163 as shown in FIG. 3. A pawl 168 is mounted, as on a post, on the outer surface of the second wall 163 to swivel between a locking position engaging with the ratchet 167 to prevent the ratchet 167 and the spindle 165 from unwinding, and as shown in FIG. 3 in the clockwise direction relative to the ratchet 167, and an open position whereby the ratchet 167 and the spindle 165 may rotate freely in either direction.

Identically as the pivot 136 of the right-hand tie-down 112, the pivot 158 of the left-hand tie-down 103 has a pin 169 and a generally circularly annular sleeve 170 rotatably mounted on the pin 169. The pin 169 is a generally circularly annular tube. The annular tube is longer than the rotatable sleeve 170, and has first and second ends and an outer surface interconnecting the first and second ends. A cap, as a first cap, is attached, as by welding, to the annular tube. The cap is a generally circularly annular ring 171 attached onto the outer surface of the annular tube adjacent to the first end thereof. The ring 171 has a minimum transverse outer dimension that is equal to or greater than the maximum transverse dimension of the rotatable sleeve 170. A base 172, as a second cap, is attached, as by welding, to the annular tube on the second end thereof. The base 172 is a plate having two opposite side surfaces 173 and 174. The second end of the annular tube is attached off-centered to the one side surface 173 of the plate of the base 172 as shown in FIG. 2. The one side surface 173 is thus proximal to the rotatable sleeve 170, and the other, opposite side surface 174 is distal from the rotatable sleeve 170. The plate of the base 172 is rectangular, with a first set of sides having one same length and a second set of sides having one same length such that the lengths of the first set are unequal to the lengths of the second set of the rectangle of the plate of the base 172. The lengths of the sides of the rectangle of the base 172 are greater than the maximum transverse dimension of the rotatable sleeve 170. The ring 171 and the base 172 thereby capture the rotatable sleeve 170 onto the pin 169 for the rotatable sleeve 170 to freely rotate on the pin 169 about an axis of rotation. The axis of rotation is aligned with the lengths of both the pin 169 and the rotatable sleeve 170.

A first flange 175 is attached, as by welding, to both the first wall 162 of the left-hand winch 159 and the rotatable sleeve 170 interconnecting the first wall 162 and the rotatable sleeve 170, and a second flange 176 is attached, as by welding, to both the second wall 163 of the left-hand winch 159 and the rotatable sleeve 170 interconnecting the second wall 163 and the rotatable sleeve 170. The one side surface 173 of the base 172 is thus proximal to the left-hand winch 159, and the opposite side surface 174 of the base 172 is distal from the left-hand winch 159. The left-hand winch 159 of the left-hand tie-down 103 is pivotal in either direction about the axis of rotation of the rotatable sleeve 170 of the pivot 158.

As shown particularly in FIG. 2 and FIG. 3, the left-hand winch 159 is counterclockwise with respect to the one side surface 173 of the base 172. The crank 166 is acutely counterclockwise from the second wall 163, in that the counterclockwise angle from the second wall 163 to the crank 166 is acute. The ratchet 167 and the spindle 165 wind in the counterclockwise direction which the pawl 168 of the left-hand winch 159 permits when the pawl 168 is in the locking position. When the left-hand winch 159 is pivoting counterclockwise then the crank 166 is leading and the ratchet 167 is following.

Identically as the right-hand tie-down 112, the flanges 175 and 176 of the left-hand tie-down 103 space the first wall 162, the second wall 163, the third wall 164, and the U-shaped frame 161 from the rotatable sleeve 170. The third wall 164 is perpendicular to the rotatable sleeve 170, in that the third wall 164, although spaced from the rotatable sleeve 170, extends by projection radially outwardly away from the axis of rotation of the rotatable sleeve 170 as shown in FIG. 2 and FIG. 3. The first wall 162 and the second wall 163 extend parallel with the axis of rotation of the rotatable sleeve 170 as shown in FIG. 2 and FIG. 3. Thus, the U-shaped frame 161 has the U shape thereof opening spaced from the axis of rotation of the rotatable sleeve 170, and parallel with the axis of rotation of the rotatable sleeve 170 in the direction of from the ring 171 to the base 172.

The opposite side surface 174 of the base 172 of the pivot 158 is attached, as by welding, to the surface 128 of the C-shaped channel of the shelf 121 as shown in FIG. 4, FIG. 5, and FIG. 6. The shelf 121 attaches the left-hand tie-down 103 to the vehicle 10 so that the axis of rotation of the rotatable sleeve 170 is generally perpendicular to the support surface 11 to angularly position the left-hand winch 159 by pivoting the left-hand winch 159 to any plane angle about the axis of rotation relative to the support surface 11, and preferably, when the axis of rotation is generally vertical, that the left-hand winch 159 is pivotal to any angle horizontally.

Another embodiment of the present invention is shown in FIG. 11, FIG. 12, and FIG. 13 as, generally, a system 200 for securing a load to a vehicle that is for transporting the load. The securing system 200 is generally identical to the securing system 100 as shown in FIG. 1 through FIG. 10 and as described hereinbefore except as shown in FIG. 11, FIG. 12, and FIG. 13 and as described hereinafter. Specifically, for each of the left-hand tie-downs and each of the right-hand tie-downs of the securing system 200, the second end of the pin of the pivot thereof is attached centered to the one side surface of the plate of the base of the pivot. Also, the plate of the base of the pivot thereof is generally square, with a first set of sides having one same length and a second set of sides having one same length such that the lengths of the first set are generally equal to the lengths of the second set of the plate of the base of the pivot.

In particular, the securing system 200 secures a load to a vehicle that is for transporting the load identically as shown in FIG. 4. The vehicle identically has a support surface for supporting the load when the vehicle is transporting the load, sets of spaced-apart stake pockets adjacent to the sides of the support surface, and side rails attached to the sets of the stake pockets so that the stake pockets space the side rails from the sides of the support surface with the sets of the stake pockets being between the side rails and the sides of the support surface, respectively. Further, the securing system 200 of the present invention is contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

Generally identically as the securing system 100, the securing system 200 comprises a tie-down system and a shelf system. The tie-down system of the securing system 200 comprises a plurality of tie-downs that secure the load to the support surface of the vehicle, and the shelf system of the securing system 200 comprises a plurality of shelves that are attached to the vehicle for supporting the plurality of the tie-downs, respectively. Each tie-down of the securing system 200 includes a strap and an attachment, as a hook, respectively, which may be identically as shown in FIG. 4;

the straps and the attachments are known in the art. The tie-downs of the securing system 200 engage the load, as by directly connecting the attachments to the load identically as shown in FIG. 4, and then secure the load on the support surface by tightening the straps with the tie-downs. The securing system 200 of the present invention is contemplated to be used, at least, with any number of the tie-downs thereof on at least a like number of the shelves thereof so as to secure the load onto the support surface of the vehicle to prevent the load from unintentionally moving relative to the support surface during the transporting thereof.

The shelf system of the securing system 200 may be identical to the shelf system 102 of the securing system 100. In particular, the shelves of the shelf system of the securing system 200 are attached to the vehicle adjacent to the support surface identically as shown in FIG. 4. Each shelf extends outwardly away from the support surface, and supports one of the tie-downs, respectively, of the tie-down system of the securing system 200 when the tie-down thereof is attached thereto, as by welding. Each tie-down is attached to the respective shelf preferably adjacent the distal side of the respective shelf, so that the tie-downs are thus spaced widely apart transversely with respect to the support surface of the vehicle to accommodate wider loads, preferably up to the maximum width possible and permissible for the support surface and for the vehicle, for transporting the wider loads with the vehicle.

Each shelf of the shelf system of the securing system 200, which may be identical to each shelf of the shelf system 102 and as shown identically in FIG. 5 and FIG. 6, is a channel that is cross-sectionally generally C-shaped. The C-shaped channel has a surface for supporting the tie-down thereof when the tie-down thereof is attached to the surface, and the C shape of the channel opens outwardly opposite to the surface. As may be identically as shown in FIG. 5 and FIG. 6, the C-shaped channel has a proximal side, a distal side opposite from the proximal side, and two extending sides interconnecting the proximal side and the distal side. The C-shaped channel also has an undersurface, with a generally triangularly shaped gusset being attached, as by welding, to the undersurface, preferably midway along the undersurface. The C-shaped channel and the gusset are each made of suitable structural material, as metal. The gusset has a proximal end and is shorter than the C-shaped channel identically as shown in FIG. 6. The proximal end of the gusset is aligned with the proximal side of the C-shaped channel. The shelf is attached, as by welding, at the proximal side and at the proximal end to one side rail of the vehicle adjacent to the support surface of the vehicle. The gusset thus interconnects the C-shaped channel and the vehicle. The shelf extends outwardly away from the support surface from the proximal side to the distal side. The surface of the C-shaped channel of the shelf is generally level with the support surface of the vehicle.

The plurality of the tie-downs of the tie-down system of the securing system 200 comprises a plurality of left-hand tie-downs and a plurality of right-hand tie-downs, which may be generally identically as shown in FIG. 4. Each left-hand tie-down and each right-hand tie-down is attached to the shelves thereof, respectively, so that a person rotating the left-hand tie-downs and the right-hand tie-downs to secure the load on the support surface by tightening the straps thereof is positioned along the sides of the support surface towards the center of the vehicle. Therefore, the person is always on the left-hand side of any left-hand tie-down and is always on the right-hand side of any right-hand tie-down, identically as shown in FIG. 4. The right-hand tie-downs of the tie-down system of the securing system 200 are identical with each other, and the left-hand tie-downs of the tie-down system of the securing system 200 are identical with each other; and the left-hand tie-downs are generally the same as the right-hand tie-downs except for being left-hand for right-hand as described and shown herein. As such, the right-hand tie-down 201 is typical of the right-hand tie-downs and is shown in greater detail in FIG. 11, with FIG. 7 and FIG. 9 that show the right-hand tie-down 112 of the tie-down system 101 being otherwise identical with showing the right-hand tie-down 201, and with FIG. 8 and FIG. 10 that show the right-hand tie-down 112 of the tie-down system 101 being generally identical with showing the right-hand tie-down 201 except as shown in FIG. 11 and as described herein. The left-hand tie-down 202 is typical of the left-hand tie-downs of the tie-down system of the securing system 200 and is shown in greater detail in FIG. 12 and FIG. 13.

The right-hand tie-down 201 has a pivot 203, and a right-hand winch 204, each made of suitable structural material, as metal. The right-hand winch 204 may be a hand winch 205 as shown in FIG. 11. The right-hand winch 204 has a generally U-shaped frame 206 comprising a first wall 207, a second wall 208, and a third wall 209. The first wall 207 and the second wall 208 extend from the third wall 209, and the third wall 209 interconnects the first wall 207 and the second wall 208 at proximal ends thereof, thus defining the U shape. Rotatably mounted within apertures in the first wall 207 and the second wall 208 is a spindle 210 having a first end extending beyond the outer surface of the first wall 207 identically as shown in FIG. 7, and a second end extending beyond the outer surface of the second wall 208. The strap thereof is removably attachable to the spindle 210, as by engagement slots in the spindle 210, so as to be wound and unwound on the spindle 210. Shown as the hand winch 205, the first end of the spindle 210 has a crank attached thereto, as by welding, adjacent to the outer surface of the first wall 207 identically as shown in FIG. 7. The crank and the first end of the spindle 210 have engagement holes for receiving a hand tool (not shown) for rotating the spindle 210. The second end of the spindle 210 has a ratchet 211 attached thereto, as by welding, adjacent to the outer surface of the second wall 208 as shown in FIG. 11. A pawl 212 is mounted, as on a post, on the outer surface of the second wall 208 to swivel between a locking position engaging with the ratchet 211 to prevent the ratchet 211 and the spindle 210 from unwinding, and as shown in FIG. 11 in the counterclockwise direction relative to the ratchet 211, and an open position whereby the ratchet 211 and the spindle 210 may rotate freely in either direction.

Figure 9:
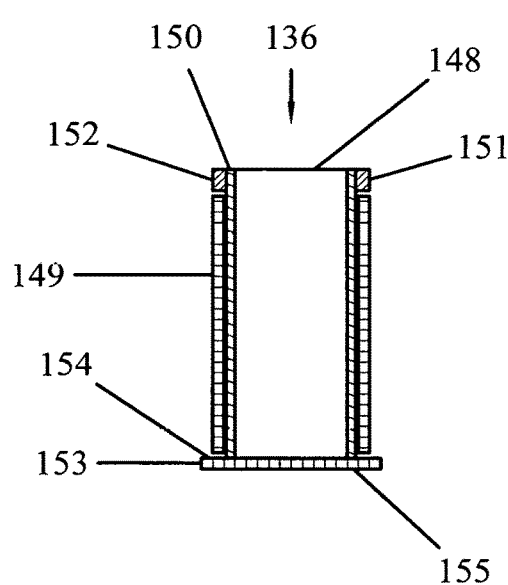
FIG. 9 is a cross-sectional view taken on line 9-9 in FIG. 8.

The pivot 203 has a pin 213 and a generally circularly annular sleeve 214 rotatably mounted on the pin 213. The pin 213 is a generally circularly annular tube identically as shown in FIG. 9. The annular tube is longer than the rotatable sleeve 214, and has first and second ends and an outer surface interconnecting the first and second ends. A cap, as a first cap, is attached, as by welding, to the annular tube. The cap is a generally circularly annular ring 215 attached onto the outer surface of the annular tube adjacent to the first end thereof. The ring 215 has a minimum transverse outer dimension that is equal to or greater than the maximum transverse dimension of the rotatable sleeve 214. A base 216, as a second cap, is attached, as by welding, to the annular tube on the second end thereof. The base 216 is a plate having two opposite side surfaces 217 and 218. The second end of the annular tube is attached centered to the one side surface 217 of the plate of the base 216 as shown in FIG. 11. The one side surface 217 is thus proximal to the rotatable sleeve 214, and the other, opposite side surface 218 is distal from the rotatable sleeve 214. The plate of the base 216 is generally square, with a first set of sides having one same length and a second set of sides having one same length such that the lengths of the first set are generally equal to the lengths of the second set of the square of the plate of the base 216. The lengths of the sides of the square of the base 216 are greater than the maximum transverse dimension of the rotatable sleeve 214. The ring 215 and the base 216 thereby capture the rotatable sleeve 214 onto the pin 213 for the rotatable sleeve 214 to freely rotate on the pin 213 about an axis of rotation. The axis of rotation is aligned with the lengths of both the pin 213 and the rotatable sleeve 214.

A first flange 219 is attached, as by welding, to both the first wall 207 of the right-hand winch 204 and the rotatable sleeve 214 interconnecting the first wall 207 and the rotatable sleeve 214, and a second flange 220 is attached, as by welding, to both the second wall 208 of the right-hand winch 204 and the rotatable sleeve 214 interconnecting the second wall 208 and the rotatable sleeve 214. The one side surface 217 of the base 216 is thus proximal to the right-hand winch 204, and the opposite side surface 218 of the base 216 is distal from the right-hand winch 204 as shown in FIG. 11. The right-hand winch 204 of the right-hand tie-down 201 is pivotal in either direction about the axis of rotation of the rotatable sleeve 214 of the pivot 203.

As shown particularly in FIG. 11, and as identically shown in FIG. 7, the right-hand winch 204 is clockwise with respect to the one side surface 217 of the base 216. The crank is acutely clockwise from the second wall 208, in that the clockwise angle from the second wall 208 to the crank is acute. The ratchet 211 and the spindle 210 wind in the clockwise direction which the pawl 212 of the right-hand winch 204 permits when the pawl 212 is in the locking position. When the right-hand winch 204 is pivoting clockwise then the crank is leading and the ratchet 211 is following as identically shown in FIG. 7.

The flanges 219 and 220 of the right-hand tie-down 201 space the first wall 207, the second wall 208, the third wall 209, and the U-shaped frame 206 from the rotatable sleeve 214. The third wall 209 is perpendicular to the rotatable sleeve 214, in that the third wall 209, although spaced from the rotatable sleeve 214, extends by projection radially outwardly away from the axis of rotation of the rotatable sleeve 214 as shown in FIG. 11. The first wall 207 and the second wall 208 extend parallel with the axis of rotation of the rotatable sleeve 214 as shown in FIG. 11. Thus, the U-shaped frame 206 has the U shape thereof opening spaced from the axis of rotation of the rotatable sleeve 214, and parallel with the axis of rotation of the rotatable sleeve 214 in the direction of from the ring 215 to the base 216.

The opposite side surface 218 of the base 216 of the pivot 203 is attached, as by welding, to the surface of the C-shaped channel of the shelf of the shelf system of the securing system 200 identically as shown in FIG. 5. The shelf attaches the right-hand tie-down 201 to the vehicle so that the axis of rotation of the rotatable sleeve 214 is generally perpendicular to the support surface to angularly position the right-hand winch 204 by pivoting the right-hand winch 204 to any plane angle about the axis of rotation relative to the support surface, and preferably, when the axis of rotation is generally vertical, that the right-hand winch 204 is pivotal to any angle horizontally.

The left-hand tie-down 202 has, identically as the right-hand tie-down 201 has, a pivot 221, and a left-hand winch 222, each made of suitable structural material, as metal. The left-hand winch 222 may be a hand winch 223 as shown in FIG. 12 and FIG. 13. The left-hand winch 222 has a generally U-shaped frame 224 comprising a first wall 225, a second wall 226, and a third wall 227. The first wall 225 and the second wall 226 extend from the third wall 227, and the third wall 227 interconnects the first wall 225 and the second wall 226 at proximal ends thereof, thus defining the U shape. Rotatably mounted within apertures in the first wall 225 and the second wall 226 is a spindle 228 having a first end extending beyond the outer surface of the first wall 225, and a second end extending beyond the outer surface of the second wall 226. The strap thereof is removably attachable to the spindle 228, as by engagement slots in the spindle 228, so as to be wound and unwound on the spindle 228. Shown as the hand winch 223, the first end of the spindle 228 has a crank 229 attached thereto, as by welding, adjacent to the outer surface of the first wall 225. The crank 229 and the first end of the spindle 228 have engagement holes for receiving a hand tool (not shown) for rotating the spindle 228. The second end of the spindle 228 has a ratchet 230 attached thereto, as by welding, adjacent to the outer surface of the second wall 226 as shown in FIG. 13. A pawl 231 is mounted, as on a post, on the outer surface of the second wall 226 to swivel between a locking position engaging with the ratchet 230 to prevent the ratchet 230 and the spindle 228 from unwinding, and as shown in FIG. 13 in the clockwise direction relative to the ratchet 230, and an open position whereby the ratchet 230 and the spindle 228 may rotate freely in either direction.

Identically as the pivot 203 of the right-hand tie-down 201, the pivot 221 of the left-hand tie-down 202 has a pin 232 and a generally circularly annular sleeve 233 rotatably mounted on the pin 232. The pin 232 is a generally circularly annular tube. The annular tube is longer than the rotatable sleeve 233, and has first and second ends and an outer surface interconnecting the first and second ends. A cap, as a first cap, is attached, as by welding, to the annular tube. The cap is a generally circularly annular ring 234 attached onto the outer surface of the annular tube adjacent to the first end thereof. The ring 234 has a minimum transverse outer dimension that is equal to or greater than the maximum transverse dimension of the rotatable sleeve 233. A base 235, as a second cap, is attached, as by welding, to the annular tube on the second end thereof. The base 235 is a plate having two opposite side surfaces 236 and 237. The second end of the annular tube is attached centered to the one side surface 236 of the plate of the base 235 as shown in FIG. 12. The one side surface 236 is thus proximal to the rotatable sleeve 233, and the other, opposite side surface 237 is distal from the rotatable sleeve 233. The plate of the base 235 is generally square, with a first set of sides having one same length and a second set of sides having one same length such that the lengths of the first set are generally equal to the lengths of the second set of the square of the plate of the base 235. The lengths of the sides of the square of the base 235 are greater than the maximum transverse dimension of the rotatable sleeve 233. The ring 234 and the base 235 thereby capture the rotatable sleeve 233 onto the pin 232 for the rotatable sleeve 233 to freely rotate on the pin 232 about an axis of rotation. The axis of rotation is aligned with the lengths of both the pin 232 and the rotatable sleeve 233.

A first flange 238 is attached, as by welding, to both the first wall 225 of the left-hand winch 222 and the rotatable sleeve 233 interconnecting the first wall 225 and the rotatable sleeve 233, and a second flange 239 is attached, as by welding, to both the second wall 226 of the left-hand winch 222 and the rotatable sleeve 233 interconnecting the second wall 226 and the rotatable sleeve 233. The one side surface 236 of the base 235 is thus proximal to the left-hand winch 222, and the opposite side surface 237 of the base 235 is distal from the left-hand winch 222. The left-hand winch 222 of the left-hand tie-down 202 is pivotal in either direction about the axis of rotation of the rotatable sleeve 233 of the pivot 221.

As shown particularly in FIG. 12 and FIG. 13, the left-hand winch 222 is counterclockwise with respect to the one side surface 236 of the base 235. The crank 229 is acutely counterclockwise from the second wall 226, in that the counterclockwise angle from the second wall 226 to the crank 229 is acute. The ratchet 230 and the spindle 228 wind in the counterclockwise direction which the pawl 231 of the left-hand winch 222 permits when the pawl 231 is in the locking position. When the left-hand winch 222 is pivoting counterclockwise then the crank 229 is leading and the ratchet 230 is following.

Identically as the right-hand tie-down 201, the flanges 238 and 239 of the left-hand tie-down 202 space the first wall 225, the second wall 226, the third wall 227, and the U-shaped frame 224 from the rotatable sleeve 233. The third wall 227 is perpendicular to the rotatable sleeve 233, in that the third wall 227, although spaced from the rotatable sleeve 233, extends by projection radially outwardly away from the axis of rotation of the rotatable sleeve 233 as shown in FIG. 12 and FIG. 13. The first wall 225 and the second wall 226 extend parallel with the axis of rotation of the rotatable sleeve 233 as shown in FIG. 12 and FIG. 13. Thus, the U-shaped frame 224 has the U shape thereof opening spaced from the axis of rotation of the rotatable sleeve 233, and parallel with the axis of rotation of the rotatable sleeve 233 in the direction of from the ring 234 to the base 235.

The opposite side surface 237 of the base 235 of the pivot 221 is attached, as by welding, to the surface of the C-shaped channel of the shelf of the shelf system of the securing system 200 identically as shown in FIG. 5. The shelf attaches the left-hand tie-down 202 to the vehicle so that the axis of rotation of the rotatable sleeve 233 is generally perpendicular to the support surface to angularly position the left-hand winch 222 by pivoting the left-hand winch 222 to any plane angle about the axis of rotation relative to the support surface, and preferably, when the axis of rotation is generally vertical, that the left-hand winch 222 is pivotal to any angle horizontally.

Figure 17:
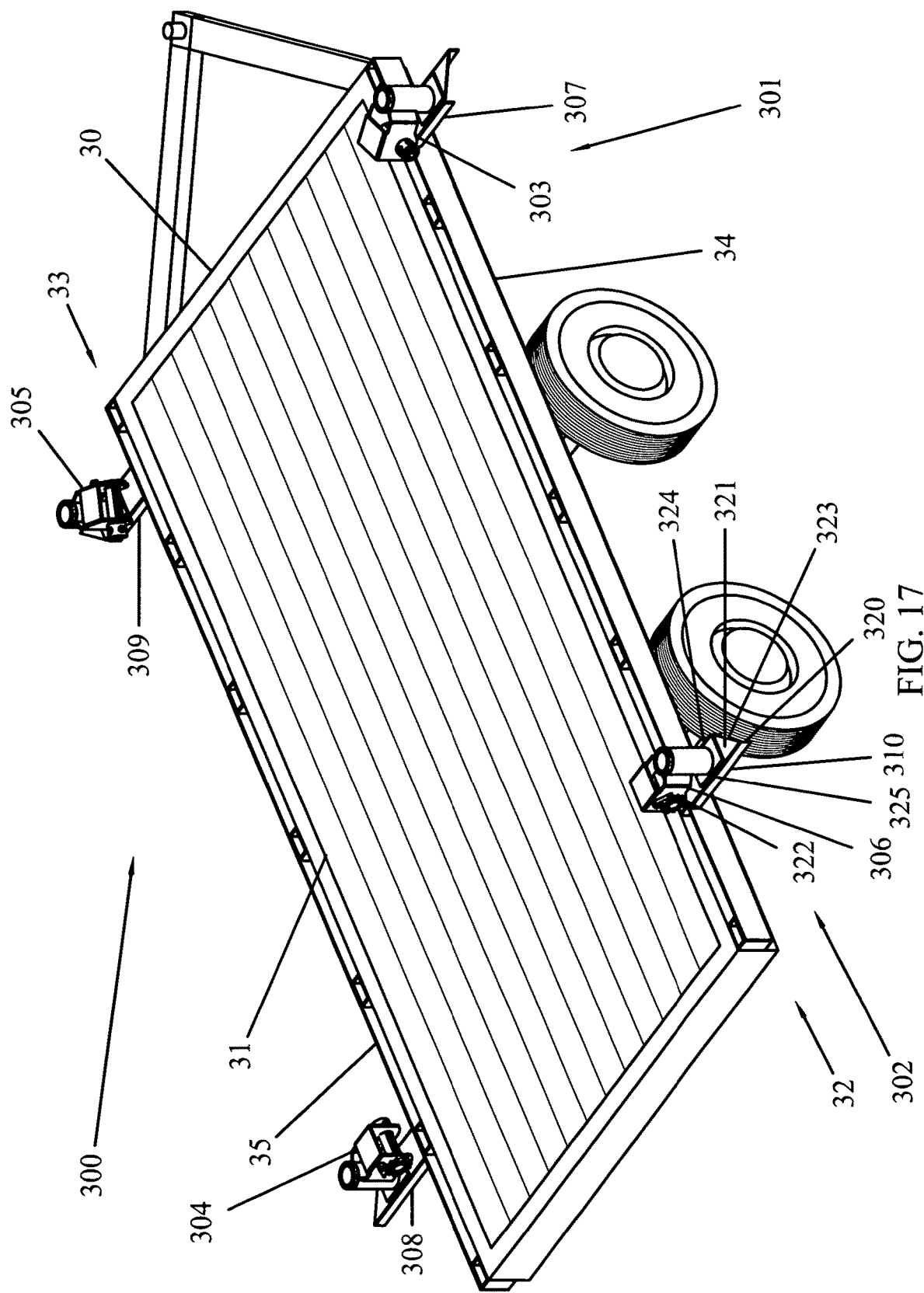
FIG. 17 is a perspective view of the embodiment of the present invention, as shown in FIG. 14 through FIG. 16, wherein a plurality of left-hand tie-downs and right-hand tie-downs are attached to a plurality of left-hand support shelves and right-hand support shelves which are attached to a trailer adjacent to the cargo bed thereof.

Yet another embodiment of the present invention is shown in FIG. 17 as, generally, a system 300 for securing a load, which may be similar to that shown in FIG. 4, to a vehicle 30 that is for transporting the load. The securing system 300 is generally identical to the securing system 100 as shown in FIG. 1 through FIG. 10 and as described hereinbefore except as shown in FIG. 14 through FIG. 19 and as described hereinafter. Specifically, for each of the left-hand tie-downs and each of the right-hand tie-downs of the securing system 300, the second end of the pin of the pivot thereof is attached centered to the one side surface of the plate of the base of the pivot. Also, the shelf system of the securing system 300 comprises a plurality of shelves that comprises a plurality of left-hand shelves and right-hand shelves.

In particular, the securing system 300 secures a load to the vehicle 30 that is for transporting generally identically the load as shown in FIG. 4. The vehicle 30 has a support surface 31 for supporting the load when the vehicle 30 is transporting the load. The vehicle 30 further has sets 32 and 33 of spaced-apart stake pockets adjacent to the sides of the support surface 31. Side rails 34 and 35 are attached to the sets 32 and 33 of the stake pockets, respectively, spacing the side rails 34 and 35 from the sides of the support surface 31. The sets 32 and 33 of the stake pockets are between the side rails 34 and 35 and the sides of the support surface 31, respectively. Although the vehicle 30 in FIG. 17 is shown specifically as a trailer, this yet other embodiment of the present invention is contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

Generally identically as the securing system 100, the securing system 300 comprises a tie-down system 301 and a shelf system 302. The tie-down system 301 comprises a plurality of tie-downs 303, 304, 305, and 306 that secure the load to the support surface 31 of the vehicle 30. The shelf system 302 comprises a plurality of shelves 307, 308, 309, and 310 that are attached to the vehicle 30 for supporting the plurality of the tie-downs 303, 304, 305, and 306, respectively. While four tie-downs 303, 304, 305, and 306 and four shelves 307, 308, 309, and 310 are specifically shown in FIG. 17, this yet other embodiment of the present invention is contemplated to be used, at least, with any number of the tie-downs of the tie-down system 301 on at least a like number of the shelves of the shelf system 302 so as to secure the load onto the support surface 31 of the vehicle 30 to prevent the load from unintentionally moving relative to the support surface 31 during the transporting thereof. Each tie-down 303, 304, 305, and 306 includes a strap and an attachment, as a hook, respectively, which may be identically as shown in FIG. 4; the straps and the attachments are known in the art. The tie-downs 303, 304, 305, and 306 engage the load, as by directly connecting the attachments to the load identically as shown in FIG. 4, and then secure the load on the support surface 31 by tightening the straps with the tie-downs 303, 304, 305, and 306.

The shelves 307, 308, 309, and 310 of the shelf system 302 are attached to the vehicle 30 adjacent to the support surface 31 as shown in FIG. 17. Each shelf 307, 308, 309, and 310 extends outwardly away from the support surface 31. Each shelf 307, 308, 309, and 310 supports one of the tie-downs 303, 304, 305, and 306, respectively, when the tie-down thereof is attached thereto, as by welding. The tie-downs 303, 304, 305, and 306 are thus spaced widely apart transversely with respect to the support surface 31 of the vehicle 30 to accommodate wider loads, preferably up to the maximum width possible and permissible for the support surface 31 and for the vehicle 30, for transporting the wider loads with the vehicle 30.

The plurality of the shelves of the shelf system 302 comprises a plurality of left-hand shelves 307 and 308 and a plurality of right-hand shelves 309 and 310 as shown in FIG. 17. Each left-hand shelf 307 and 308 and each right-hand shelf 309 and 310 is attached to the vehicle 30 corresponding to the left-hand tie-downs and the right-hand tie-downs, respectively, of the tie-down system 301 as described herein. Thus, on the right-hand side of the vehicle 30, adjacent to the side rail 34, the left-hand shelf 307 is near the front right corner of the support surface 31 of the vehicle 30 and the right-hand shelf 310 is near the rear right corner of the support surface 31 of the vehicle 30. On the left-hand side of the vehicle 30, adjacent the side rail 35, the right-hand shelf 309 is near the front left corner of the support surface 31 of the vehicle 30 and the left-hand shelf 308 is near the rear left corner of the support surface 31 of the vehicle 30. Shelves that are next closer towards the center along the sides of the vehicle 30 from the corners of the support surface 31 are likewise left-hand shelves or right-hand shelves as are the shelves nearest the corners. At or near the center along the sides of the vehicle 30, the shelves of the shelf system 302 may be either a left-hand shelf or a right-hand shelf.

The left-hand shelves 307 and 308 are identical with each other, and the right-hand shelves 309 and 310 are identical with each other; and the right-hand shelves are generally the same as the left-hand shelves except for being right-hand for left-hand as described and shown herein. As such, the left-hand shelf 307 is typical of the left-hand shelves 307 and 308, and is shown in greater detail in FIG. 18 and FIG. 19. The right-hand shelf 310 is typical of the right-hand shelves 309 and 310 and is shown in FIG. 17, with FIG. 18 that shows the left-hand shelf 307 being otherwise identical with showing the right-hand shelf 310.

Figure 18:
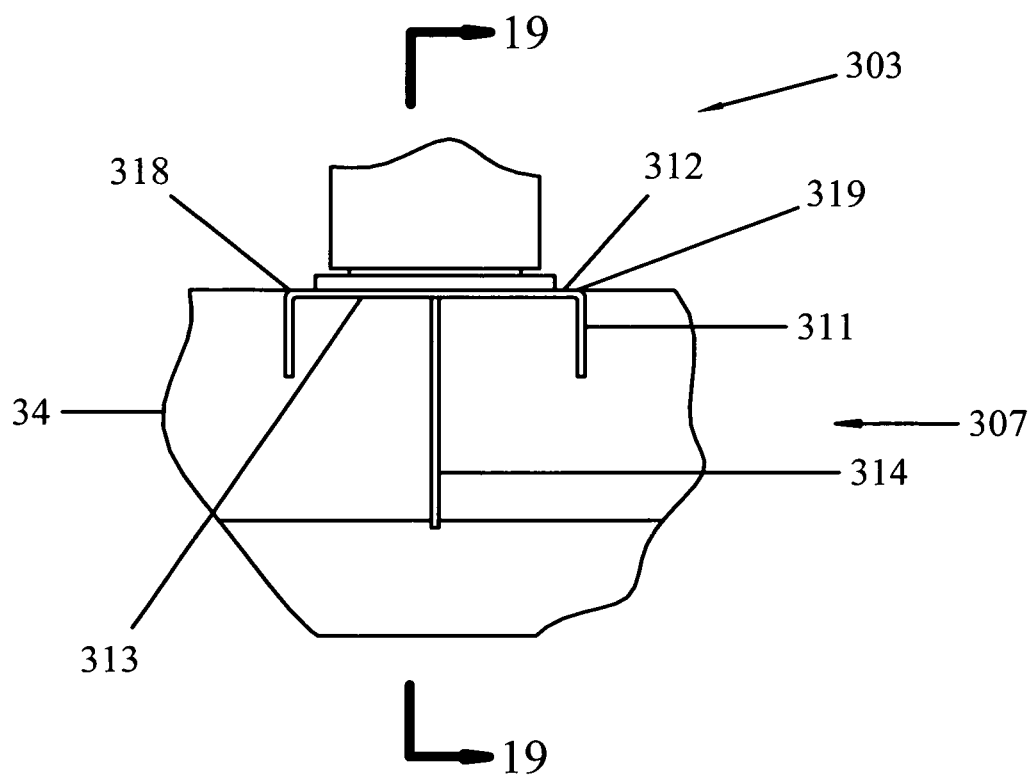
FIG. 18 is an end view, partly broken, of the embodiment of the present invention, as shown in FIG. 17, of one support shelf.
Figure 19:
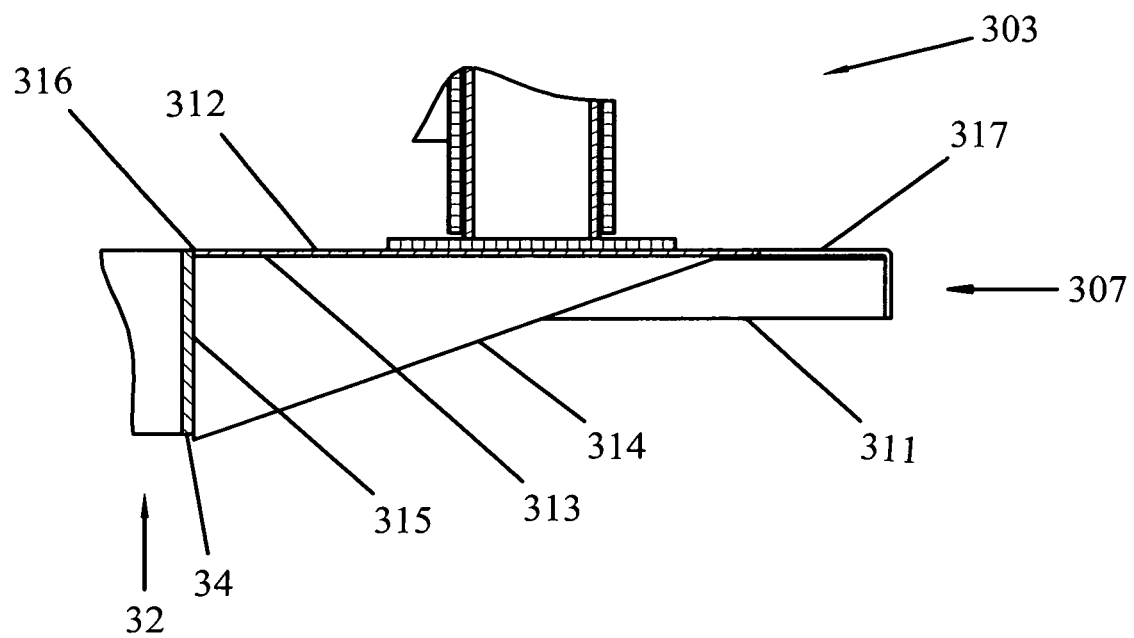
FIG. 19 is a cross-sectional view, partly broken, taken on line 19-19 in FIG. 18.

The left-hand shelf 307 is a left-hand channel 311 that is cross-sectionally generally C-shaped. The C-shaped left-hand channel 311 has a surface 312 for supporting the tie-down 303. The C shape of the left-hand channel 311 opens outwardly opposite to the surface 312 as shown in FIG. 18. The tie-down 303 is attached, as by welding, to the surface 312. The C-shaped left-hand channel 311 also has an undersurface 313. A generally triangularly shaped gusset 314 is attached, as by welding, to the undersurface 313, preferably midway along the undersurface 313. The gusset 314 has a proximal end 315, and is shorter than the C-shaped left-hand channel 311 as shown in FIG. 19. The C-shaped left-hand channel 311 and the gusset 314 are each made of suitable structural material, as metal.

The C-shaped left-hand channel 311 of the left-hand shelf 307 has a proximal side 316, a distal side 317 opposite from the proximal side 316, and a first extending side 318 and a second extending side 319 interconnecting the proximal side 316 and the distal side 317. The distal side 317 is not parallel with the proximal side 316. The first and second extending sides 318 and 319 are parallel with each other, and each has a length defined between the proximal side 316 and the distal side 317. The lengths of the first and second extending sides 318 and 319 are unequal.

As shown particularly in FIG. 17, FIG. 18, and FIG. 19, the shelf 307 is left-hand with respect to the surface 312 of the left-hand shelf 307. The first extending side 318 interconnects the proximal side 316 and the distal side 317 counterclockwise with respect to the surface 312, in that the direction from the proximal side 316 to the first extending side 318 and thence to the distal side 317 is counterclockwise around the perimeter of the surface 312 when the surface 312 is viewed in plan. The second extending side 319 interconnects the proximal side 316 and the distal side 317 counterclockwise with respect to the surface 312, in that the direction from the distal side 317 to the second extending side 319 and thence to the proximal side 316 is counterclockwise around the perimeter of the surface 312 when the surface 312 is viewed in plan. The length of the first extending side 318 is less than the length of the second extending side 319 as shown in FIG. 17.

The proximal end 315 of the gusset 314 is aligned with the proximal side 316 of the C-shaped left-hand channel 311. The left-hand shelf 307 is attached, as by welding, at the proximal side 316 and at the proximal end 315 to the side rail 34 of the vehicle 30 adjacent to the support surface 31 of the vehicle 30. The gusset 314 thus interconnects the C-shaped left-hand channel 311 and the vehicle 30. The left-hand shelf 307 extends outwardly away from the support surface 31 from the proximal side 316 to the distal side 317. The surface 312 of the C-shaped left-hand channel 311 of the left-hand shelf 307 is generally level with the support surface 31 of the vehicle 30.

The right-hand shelf 310 is a right-hand channel 320 that is cross-sectionally generally C-shaped. The C-shaped right-hand channel 320 has a surface 321 for supporting the tie-down 306. The C shape of the right-hand channel 320 opens outwardly opposite to the surface 321 identically as shown in FIG. 18. The tie-down 306 is attached, as by welding, to the surface 321. The C-shaped right-hand channel 320 also has an undersurface. A generally triangularly shaped gusset is attached, as by welding, to the undersurface, preferably midway along the undersurface. The gusset has a proximal end, and is shorter than the C-shaped right-hand channel 320 similarly as shown in FIG. 19. The C-shaped right-hand channel 320 and the gusset are each made of suitable structural material, as metal.

The C-shaped right-hand channel 320 of the right-hand shelf 310 has a proximal side 322, a distal side 323 opposite from the proximal side 322, and a first extending side 324 and a second extending side 325 interconnecting the proximal side 322 and the distal side 323. The distal side 323 is not parallel with the proximal side 322. The first and second extending sides 324 and 325 are parallel with each other, and each has a length defined between the proximal side 322 and the distal side 323. The lengths of the first and second extending sides 324 and 325 are unequal.

As shown particularly in FIG. 17, the shelf 310 is right-hand with respect to the surface 321 of the right-hand shelf 310. The first extending side 324 interconnects the proximal side 322 and the distal side 323 clockwise with respect to the surface 321, in that the direction from the proximal side 322 to the first extending side 324 and thence to the distal side 323 is clockwise around the perimeter of the surface 321 when the surface 321 is viewed in plan. The second extending side 325 interconnects the proximal side 322 and the distal side 323 clockwise with respect to the surface 321, in that the direction from the distal side 323 to the second extending side 325 and thence to the proximal side 322 is clockwise around the perimeter of the surface 321 when the surface 321 is viewed in plan. The length of the first extending side 324 is less than the length of the second extending side 325 as shown in FIG. 17.

The proximal end of the gusset is aligned with the proximal side 322 of the C-shaped right-hand channel 320. The right-hand shelf 310 is attached, as by welding, at the proximal side 322 of the C-shaped right-hand channel 320 and at the proximal end of the gusset to the side rail 34 of the vehicle 30 adjacent to the support surface 31 of the vehicle 30. The gusset thus interconnects the C-shaped right-hand channel 320 and the vehicle 30. The right-hand shelf 310 extends outwardly away from the support surface 31 from the proximal side 322 to the distal side 323. The surface 321 of the C-shaped right-hand channel 320 of the right-hand shelf 310 is generally level with the support surface 31 of the vehicle 30.

The plurality of the tie-downs of the tie-down system 301 comprises a plurality of left-hand tie-downs 303 and 304 and a plurality of right-hand tie-downs 305 and 306 as shown in FIG. 17. Each left-hand tie-down 303 and 304 is attached to the left-hand shelves 307 and 308, respectively, and each right-hand tie-down 305 and 306 is attached to the right-hand shelves 309 and 310, respectively, so that a person rotating the left-hand tie-downs 303 and 304 and the right-hand tie-downs 305 and 306 to secure the load on the support surface 31 by tightening the straps thereof is positioned along the sides of the support surface 31 towards the center of the vehicle 30. Therefore, the person is always on the left-hand side of any left-hand tie-down 303 and 304 and always on the left-hand side of any left-hand shelf 307 and 308, and is always on the right-hand side of any right-hand tie-down 305 and 306 and always on the right-hand side of any right-hand shelf 309 and 310. Thus, on the right-hand side of the vehicle 30, adjacent to the side rail 34, the left-hand tie-down 303 on the left-hand shelf 307 is near the front right corner of the support surface 31 of the vehicle 30 and the right-hand tie-down 306 on the right-hand shelf 310 is near the rear right corner of the support surface 31 of the vehicle 30. On the left-hand side of the vehicle 30, adjacent the side rail 35, the right-hand tie-down 305 on the right-hand shelf 309 is near the front left corner of the support surface 31 of the vehicle 30 and the left-hand tie-down 304 on the left-hand shelf 308 is near the rear left corner of the support surface 31 of the vehicle 30. Tie-downs that are next closer towards the center along the sides of the vehicle 30 from the corners of the support surface 31 are likewise left-hand tie-downs on left-hand shelves or right-hand tie-downs on right-hand shelves as are the tie-downs on the shelves thereof nearest the corners. At or near the center along the sides of the vehicle 30, the tie-downs of the tie-down system 301 may be either a left-hand tie-down on a left-hand shelf or a right-hand tie-down on a right-hand shelf.

The right-hand tie-downs 305 and 306 are identical with each other, and the left-hand tie-downs 303 and 304 are identical with each other; and the left-hand tie-downs are generally the same as the right-hand tie-downs except for being left-hand for right-hand as described and shown herein. As such, the right-hand tie-down 306 is typical of the right-hand tie-downs 305 and 306 and is shown in greater detail in FIG. 14, with FIG. 7 and FIG. 9 that show the right-hand tie-down 112 of the tie-down system 101 being otherwise identical with showing the right-hand tie-down 306, and with FIG. 8 and FIG. 10 that show the right-hand tie-down 112 of the tie-down system 101 being generally identical with showing the right-hand tie-down 306 except as shown in FIG. 14 and as described herein. The left-hand tie-down 303 is typical of the left-hand tie-downs 303 and 304 and is shown in greater detail in FIG. 15 and FIG. 16.

The right-hand tie-down 306 has a pivot 326, and a right-hand winch 327, each made of suitable structural material, as metal. The right-hand winch 327 may be a hand winch 328 as shown in FIG. 14. The right-hand winch 327 has a generally U-shaped frame 329 comprising a first wall 330, a second wall 331, and a third wall 332. The first wall 330 and the second wall 331 extend from the third wall 332, and the third wall 332 interconnects the first wall 330 and the second wall 331 at proximal ends thereof, thus defining the U shape. Rotatably mounted within apertures in the first wall 330 and the second wall 331 is a spindle 333 having a first end extending beyond the outer surface of the first wall 330 identically as shown in FIG. 7, and a second end extending beyond the outer surface of the second wall 331. The strap thereof is removably attachable to the spindle 333, as by engagement slots in the spindle 333, so as to be wound and unwound on the spindle 333. Shown as the hand winch 328, the first end of the spindle 333 has a crank attached thereto, as by welding, adjacent to the outer surface of the first wall 330 identically as shown in FIG. 7. The crank and the first end of the spindle 333 have engagement holes for receiving a hand tool (not shown) for rotating the spindle 333. The second end of the spindle 333 has a ratchet 334 attached thereto, as by welding, adjacent to the outer surface of the second wall 331 as shown in FIG. 14. A pawl 335 is mounted, as on a post, on the outer surface of the second wall 331 to swivel between a locking position engaging with the ratchet 334 to prevent the ratchet 334 and the spindle 333 from unwinding, and as shown in FIG. 14 in the counterclockwise direction relative to the ratchet 334, and an open position whereby the ratchet 334 and the spindle 333 may rotate freely in either direction.

The pivot 326 has a pin 336 and a generally circularly annular sleeve 337 rotatably mounted on the pin 336. The pin 336 is a generally circularly annular tube identically as shown in FIG. 9. The annular tube is longer than the rotatable sleeve 337, and has first and second ends and an outer surface interconnecting the first and second ends. A cap, as a first cap, is attached, as by welding, to the annular tube. The cap is a generally circularly annular ring 338 attached onto the outer surface of the annular tube adjacent to the first end thereof. The ring 338 has a minimum transverse outer dimension that is equal to or greater than the maximum transverse dimension of the rotatable sleeve 337. A base 339, as a second cap, is attached, as by welding, to the annular tube on the second end thereof. The base 339 is a plate having two opposite side surfaces 340 and 341. The second end of the annular tube is attached centered to the one side surface 340 of the plate of the base 339 as shown in FIG. 14. The one side surface 340 is thus proximal to the rotatable sleeve 337, and the other, opposite side surface 341 is distal from the rotatable sleeve 337. The plate of the base 339 has transverse dimensions that are unequal transverse width and transverse length, greater than the transverse width, as shown in FIG. 14. The plate of the base 339 is thus rectangular, with the transverse width thereof defining a first set of sides having one same length and the transverse length thereof defining a second set of sides having one same length such that the lengths of the first set are unequal to the lengths of the second set of the rectangle of the plate of the base 339. The transverse dimensions of the base 339 are greater than the maximum transverse dimension of the rotatable sleeve 337. The ring 338 and the base 339 thereby capture the rotatable sleeve 337 onto the pin 336 for the rotatable sleeve 337 to freely rotate on the pin 336 about an axis of rotation. The axis of rotation is aligned with the lengths of both the pin 336 and the rotatable sleeve 337.

A first flange 342 is attached, as by welding, to both the first wall 330 of the right-hand winch 327 and the rotatable sleeve 337 interconnecting the first wall 330 and the rotatable sleeve 337, and a second flange 343 is attached, as by welding, to both the second wall 331 of the right-hand winch 327 and the rotatable sleeve 337 interconnecting the second wall 331 and the rotatable sleeve 337. The one side surface 340 of the base 339 is thus proximal to the right-hand winch 327, and the opposite side surface 341 of the base 339 is distal from the right-hand winch 327 as shown in FIG. 14. The right-hand winch 327 of the right-hand tie-down 306 is pivotal in either direction about the axis of rotation of the rotatable sleeve 337 of the pivot 326.

As shown particularly in FIG. 14, and as identically shown in FIG. 7, the right-hand winch 327 is clockwise with respect to the one side surface 340 of the base 339. The crank is acutely clockwise from the second wall 331, in that the clockwise angle from the second wall 331 to the crank is acute. The ratchet 334 and the spindle 333 wind in the clockwise direction which the pawl 335 of the right-hand winch 327 permits when the pawl 335 is in the locking position. When the right-hand winch 327 is pivoting clockwise then the crank is leading and the ratchet 334 is following as identically shown in FIG. 7.

The flanges 342 and 343 of the right-hand tie-down 306 space the first wall 330, the second wall 331, the third wall 332, and the U-shaped frame 329 from the rotatable sleeve 337. The third wall 332 is perpendicular to the rotatable sleeve 337, in that the third wall 332, although spaced from the rotatable sleeve 337, extends by projection radially outwardly away from the axis of rotation of the rotatable sleeve 337 as shown in FIG. 14. The first wall 330 and the second wall 331 extend parallel with the axis of rotation of the rotatable sleeve 337 as shown in FIG. 14. Thus, the U-shaped frame 329 has the U shape thereof opening spaced from the axis of rotation of the rotatable sleeve 337, and parallel with the axis of rotation of the rotatable sleeve 337 in the direction of from the ring 338 to the base 339.

The opposite side surface 341 of the base 339 of the pivot 326 is attached, as by welding, to the surface 321 of the C-shaped right-hand channel 320 of the right-hand shelf 310 as shown in FIG. 17. The right-hand shelf 310 attaches the right-hand tie-down 306 to the vehicle 30 so that the axis of rotation of the rotatable sleeve 337 is generally perpendicular to the support surface 31 to angularly position the right-hand winch 327 by pivoting the right-hand winch 327 to any plane angle about the axis of rotation relative to the support surface 31, and preferably, when the axis of rotation is generally vertical, that the right-hand winch 327 is pivotal to any angle horizontally.

The left-hand tie-down 303 has, identically as the right-hand tie-down 306 has, a pivot 344, and a left-hand winch 345, each made of suitable structural material, as metal. The left-hand winch 345 may be a hand winch 346 as shown in FIG. 15 and FIG. 16. The left-hand winch 345 has a generally U-shaped frame 347 comprising a first wall 348, a second wall 349, and a third wall 350. The first wall 348 and the second wall 349"extend from the third wall 350, and the third wall 350 interconnects the first wall 348 and the second wall 349 at proximal ends thereof, thus defining the U shape. Rotatably mounted within apertures in the first wall 348 and the second wall 349 is a spindle 351 having a first end extending beyond the outer surface of the first wall 348, and a second end extending beyond the outer surface of the second wall 349. The strap thereof is removably attachable to the spindle 351, as by engagement slots in the spindle 351, so as to be wound and unwound on the spindle 351. Shown as the hand winch 346, the first end of the spindle 351 has a crank 352 attached thereto, as by welding, adjacent to the outer surface of the first wall 348. The crank 352 and the first end of the spindle 351 have engagement holes for receiving a hand tool (not shown) for rotating the spindle 351. The second end of the spindle 351 has a ratchet 353 attached thereto, as by welding, adjacent to the outer surface of the second wall 349 as shown in FIG. 16. A pawl 354 is mounted, as on a post, on the outer surface of the second wall 349 to swivel between a locking position engaging with the ratchet 353 to prevent the ratchet 353 and the spindle 351 from unwinding, and as shown in FIG. 16 in the clockwise direction relative to the ratchet 353, and an open position whereby the ratchet 353 and the spindle 351 may rotate freely in either direction.

Identically as the pivot 326 of the right-hand tie-down 306, the pivot 344 of the left-hand tie-down 303 has a pin 355 and a generally circularly annular sleeve 356 rotatably mounted on the pin 355. The pin 355 is a generally circularly annular tube. The annular tube is longer than the rotatable sleeve 356, and has first and second ends and an outer surface interconnecting the first and second ends. A cap, as a first cap, is attached, as by welding, to the annular tube. The cap is a generally circularly annular ring 357 attached onto the outer surface of the annular tube adjacent to the first end thereof. The ring 357 has a minimum transverse outer dimension that is equal to or greater than the maximum transverse dimension of the rotatable sleeve 356. A base 358, as a second cap, is attached, as by welding, to the annular tube on the second end thereof. The base 358 is a plate having two opposite side surfaces 359 and 360. The second end of the annular tube is attached centered to the one side surface 359 of the plate of the base 358 as shown in FIG. 15. The one side surface 359 is thus proximal to the rotatable sleeve 356, and the other, opposite side surface 360 is distal from the rotatable sleeve 356. The plate of the base 358 is rectangular, with a first set of sides having one same length and a second set of sides having one same length such that the lengths of the first set are unequal to the lengths of the second set of the rectangle of the plate of the base 358. The lengths of the sides of the rectangle of the base 358 are greater than the maximum transverse dimension of the rotatable sleeve 356. The ring 357 and the base 358 thereby capture the rotatable sleeve 356 onto the pin 355 for the rotatable sleeve 356 to freely rotate on the pin 355 about an axis of rotation. The axis of rotation is aligned with the lengths of both the pin 355 and the rotatable sleeve 356.

A first flange 361 is attached, as by welding, to both the first wall 348 of the left-hand winch 345 and the rotatable sleeve 356 interconnecting the first wall 348 and the rotatable sleeve 356, and a second flange 362 is attached, as by welding, to both the second wall 349 of the left-hand winch 345 and the rotatable sleeve 356 interconnecting the second wall 349 and the rotatable sleeve 356. The one side surface 359 of the base 358 is thus proximal to the left-hand winch 345, and the opposite side surface 360 of the base 358 is distal from the left-hand winch 345. The left-hand winch 345 of the left-hand tie-down 303 is pivotal in either direction about the axis of rotation of the rotatable sleeve 356 of the pivot 344.

As shown particularly in FIG. 15 and FIG. 16, the left-hand winch 345 is counterclockwise with respect to the one side surface 359 of the base 358. The crank 352 is acutely counterclockwise from the second wall 349, in that the counterclockwise angle from the second wall 349 to the crank 352 is acute. The ratchet 353 and the spindle 351 wind in the counterclockwise direction which the pawl 354 of the left-hand winch 345 permits when the pawl 354 is in the locking position. When the left-hand winch 345 is pivoting counterclockwise then the crank 352 is leading and the ratchet 353 is following.

Identically as the right-hand tie-down 306, the flanges 361 and 362 of the left-hand tie-down 303 space the first wall 348, the second wall 349, the third wall 350, and the U-shaped frame 347 from the rotatable sleeve 356. The third wall 350 is perpendicular to the rotatable sleeve 356, in that the third wall 350, although spaced from the rotatable sleeve 356, extends by projection radially outwardly away from the axis of rotation of the rotatable sleeve 356 as shown in FIG. 15 and FIG. 16. The first wall 348 and the second wall 349 extend parallel with the axis of rotation of the rotatable sleeve 356 as shown in FIG. 15 and FIG. 16. Thus, the U-shaped frame 347 has the U shape thereof opening spaced from the axis of rotation of the rotatable sleeve 356, and parallel with the axis of rotation of the rotatable sleeve 356 in the direction of from the ring 357 to the base 358.

The opposite side surface 360 of the base 358 of the pivot 344 is attached, as by welding, to the surface 312 of the C-shaped left-hand channel 311 of the left-hand shelf 307 as shown in FIG. 17, FIG. 18, and FIG. 19. The left-hand shelf 307 attaches the left-hand tie-down 303 to the vehicle 30 so that the axis of rotation of the rotatable sleeve 356 is generally perpendicular to the support surface 31 to angularly position the left-hand winch 345 by pivoting the left-hand winch 345 to any plane angle about the axis of rotation relative to the support surface 31, and preferably, when the axis of rotation is generally vertical, that the left-hand winch 345 is pivotal to any angle horizontally.

In use of any of the securing system 100, the securing system 200, or the securing system 300, either before or after the load is placed on the support surface of the vehicle for transporting the load, as the load 1 on the support surface 11 of the vehicle 10 or the load on the support surface 31 of the vehicle 30, one tie-down of the tie-down system thereof is selected, which may be the left-hand tie-down 103 of the tie-down system 101 for the securing system 100 or the left-hand tie-down 202 of the tie-down system for the securing system 200 or the left-hand tie-down 303 of the tie-down system 301 for the securing system 300. As identically shown in FIG. 4, the respective strap, as the strap 104 for the left-hand tie-down 103 or the strap for the left-hand tie-down 202 or the strap for the left-hand tie-down 303, is connected to and wound, as is known in the art, on the respective spindle, as the spindle 165 or the spindle 228 or the spindle 351. Then, keeping the respective pawl, as the pawl 168 or the pawl 231 or the pawl 354, in its open position, the end of the strap with the attachment is pulled out and away from the respective tie-down, as the left-hand tie-down 103 or the left-hand tie-down 202 or the left-hand tie-down 303, allowing the rotatable sleeve of the pivot to freely rotate to angularly position the winch, respectively, as the rotatable sleeve 170, the pivot 158, and the left-hand winch 159 or the rotatable sleeve 233, the pivot 221, and the left-hand winch 222 or the rotatable sleeve 356, the pivot 344, and the left-hand winch 345. The attachment is then attached to the desired location on the load when the load is on the support surface, respectively. The respective rotatable sleeve, as the rotatable sleeve 170 or the rotatable sleeve 233 or the rotatable sleeve 356, thus rotates such that the respective strap is automatically straight out from the respective spindle, as the spindle 165 or the spindle 228 or the spindle 351, and perpendicular thereto as being generally perpendicular by perspective therewith, so as to generate a force that is likewise perpendicular for securing the load to the vehicle through the tie-down, respectively, as the left-hand tie-down 103 or the left-hand tie-down 202 or the left-hand tie-down 303.

Subsequently, the respective pawl, as the pawl 168 or the pawl 231 or the pawl 354, is swivelled to its locking position, and the hand tool is inserted (not shown) into the engagement holes of the crank to rotate the spindle to rewind the strap onto the spindle, respectively, as the crank 166 and the spindle 165 or the crank 229 and the spindle 228 or the crank 352 and the spindle 351. The shelves of the respective shelf system, in particular the shelf system 102 for the securing system 100 and the shelf system for the securing system 200, and especially the left-hand shelves 307 and 308 and the right-hand shelves 309 and 310 of the shelf system 302 for the securing system 300, widely space apart the respective left-hand tie-downs and the respective right-hand tie-downs transversely with respect to the support surface of the respective vehicle to accommodate wider loads for transporting the wider loads with the respective vehicle. Further, the shelves of the respective shelf system, in particular the shelf system 102 for the securing system 100 and the shelf system for the securing system 200, and especially the left-hand shelves 307 and 308 and the right-hand shelves 309 and 310 of the shelf system 302 for the securing system 300, in so transversely spacing apart the respective tie-downs give greater clearance for the hand tool to rotate the respective crank and spindle and reduce interference with the respective vehicle or the components thereof for rotating the hand tool. For especially the left-hand shelves 307 and 308 and the right-hand shelves 309 and 310 of the shelf system 302 for the securing system 300, the lesser length of the respective first extending side thereof and the respective nonparallel distal side thereof as shown in FIG. 17 also reduce interference with the shelves themselves of the shelf system 302 for rotating the hand tool. The pawl engages the ratchet and keeps the spindle from unwinding the strap therefrom, respectively, as the pawl 168, the ratchet 167, and the spindle 165 or the pawl 231, the ratchet 230, and the spindle 228 or the pawl 354, the ratchet 353, and the spindle 351. The strap is thereby tightened to secure the load onto the support surface of the vehicle to prevent the load from unintentionally moving relative to the support surface during the transporting thereof, respectively. Typically, a plurality of the tie-downs, although not necessarily all of the tie-downs, of the tie-down system are used to secure the load, respectively, as the left-hand tie-downs 103, 106, and 109 and the right-hand tie-downs 112, 115, and 118 of the tie-down system 101 for the securing system 100 or the left-hand tie-down 202 and the right-hand tie-down 201 of the tie-down system for the securing system 200 or the left-hand tie-downs 303 and 304 and the right-hand tie-downs 305 and 306 of the tie-down system 301 for the securing system 300. The straps thereof are tightened progressively sequentially until the load is fully secured, respectively, so as to meet, for example, force limits, legal requirements, etc. necessary for the transporting of the respective load. Thus each of the securing systems 100, 200, and 300, respectively, with the tie-down systems thereof and the shelf systems, thereof, quickly secures the load to the vehicle, while also providing for wider loads on the vehicle for transporting the wider loads, providing secure attachment of the tie-downs of the tie-down system thereof from removal, providing reduced interference for rotating the hand tool when rewinding the strap onto the respective spindle, and providing less waste of production material of the tie-downs of the tie-down system thereof.

Figure 23:
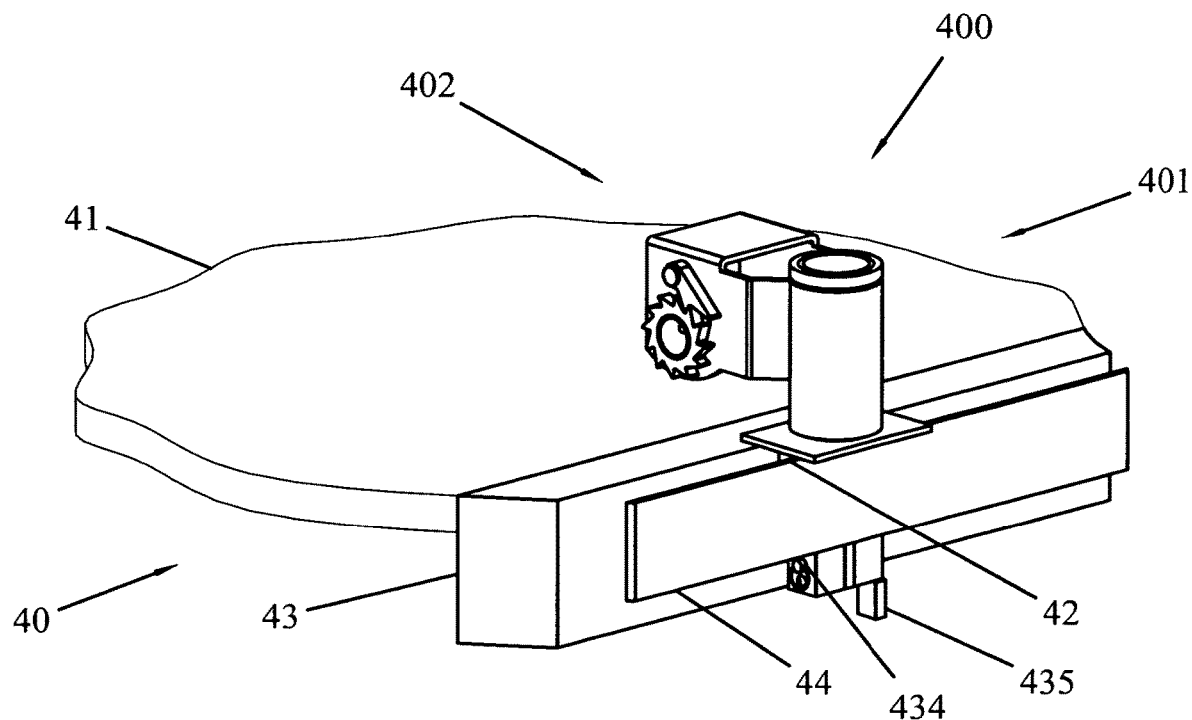
FIG. 23 is a perspective view, partly broken, of the embodiment of the present invention, as shown in FIG. 20, removably mounted in a stake pocket of a vehicle.

Still another embodiment of the present invention is shown in FIG. 23 as, generally, a system 400 for securing a load, which may be similar to that shown in FIG. 4, to a vehicle 40 that is for transporting the load. The securing system 400 is similar to the securing system 100 as shown in FIG. 1 through FIG. 10 and as described hereinbefore except as shown in FIG. 20 through FIG. 28 and as described hereinafter. Specifically, for each of the left-hand tie-downs and each of the right-hand tie-downs of the securing system 400, the second end of the pin of the pivot thereof is attached centered to the one side surface of the plate of the base of the pivot. Also, each of the left-hand tie-downs and each of the right-hand tie-downs of the securing system 400 further comprises an anchor.

In particular, the securing system 400 secures a load to the vehicle 40 that is for transporting generally identically the load as shown in FIG. 4. The vehicle 40 has a support surface 41 for supporting the load when the vehicle 40 is transporting the load. The vehicle 40 further has sets of spaced-apart stake pockets, one stake pocket 42 thereof being shown in FIG. 23, adjacent to the sides, one side 43 being shown in FIG. 23, of the support surface 41. Side rails, one side rail 44 being shown in FIG. 23, are attached to the sets of the stake pockets, respectively, spacing the side rails from the sides of the support surface 41. The sets of the stake pockets are between the side rails and the sides of the support surface 41, respectively. Although FIG. 23 shows a partly broken perspective view of the vehicle 40 with this still other embodiment of the present invention, this still other embodiment of the present invention is likewise contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

The securing system 400 comprises a tie-down system 401. The tie-down system 401 comprises a plurality of tie-downs, similarly as the plurality shown in FIG. 4 or as the plurality shown in FIG. 17, that secure the load to the support surface 41 of the vehicle 40. This still other embodiment of the present invention is contemplated to be used with any number of the tie-downs of the tie-down system 401 so as to secure the load onto the support surface 41 of the vehicle 40 to prevent the load from unintentionally moving relative to the support surface 41 during the transporting thereof. Each tie-down includes a strap and an attachment, as a hook, respectively, which may be identically as shown in FIG. 4. The straps and the attachments are known in the art. The tie-downs engage the load, as by directly connecting the attachments to the load similarly as shown in FIG. 4, and then secure the load on the support surface 41 by tightening the straps with the tie-downs.

The plurality of the tie-downs of the tie-down system 401 comprises a plurality of left-hand tie-downs and a plurality of right-hand tie-downs, similarly as the plurality shown in FIG. 4 or as the plurality shown in FIG. 17. Each left-hand tie-down and each right-hand tie-down is removably mounted to the vehicle 40 by inserting the anchor thereof into one of the stake pockets of the vehicle 40, respectively, so that a person rotating the left-hand tie-downs and the right-hand tie-downs to secure the load on the support surface 41 by tightening the straps thereof is positioned along the sides of the support surface 41 such that the person is always on the left-hand side of any left-hand tie-down and is always on the right-hand side of any right-hand tie-down, similarly as shown in FIG. 4 or as shown in FIG. 17. Although the left-hand tie-downs and the right-hand tie-downs may be removably mounted by inserting the anchor thereof into any stake pocket at any location adjacent the support surface 41 of the vehicle 40, preferably the person is positioned towards the center of the vehicle 40. Therefore, on the right-hand side of the vehicle 40, adjacent to the side rail thereof, one of the left-hand tie-downs is near the front right corner of the support surface 41 of the vehicle 40 and one of the right-hand tie-downs is near the rear right corner of the support surface 41 of the vehicle 40; and, on the left-hand side of the vehicle 40, adjacent the side rail thereof, one of the right-hand tie-downs is near the front left corner of the support surface 41 of the vehicle 40 and one of the left-hand tie-downs is near the rear left corner of the support surface 41 of the vehicle 40. Tie-downs that are next closer towards the center along the sides of the vehicle 40 from the corners of the support surface 41 are likewise left-hand tie-downs or right-hand tie-downs as are the tie-downs nearest the corners. At or near the center along the sides of the vehicle 40, the tie-downs of the tie-down system 401 may be either a left-hand tie-down or a right-hand tie-down.

The right-hand tie-downs of the tie-down system 401 are identical with each other, and the left-hand tie-downs of the tie-down system 401 are identical with each other; and the left-hand tie-downs are generally the same as the right-hand tie-downs except for being left-hand for right-hand as described and shown herein. As such, the right-hand tie-down 402 is typical of the right-hand tie-downs of the tie-down system 401 and is shown in greater detail in FIG. 20 and FIG. 23 through FIG. 28. The left-hand tie-down 403 is typical of the left-hand tie-downs of the tie-down system 401 and is shown in greater detail in FIG. 21 and FIG. 22.

The right-hand tie-down 402 has a pivot 404, a right-hand winch 405, and an anchor 406. The pivot 404, the right-hand winch 405, and the anchor 406 are each made of suitable structural material, as metal. The right-hand winch 405 may be a hand winch 407 as shown. The right-hand winch 405 has a generally U-shaped frame 408. The U-shaped frame 408 has a first wall 409, a second wall 410, and a third wall 411. The first wall 409 and the second wall 410 extend generally perpendicularly from the third wall 411, and the third wall 411 interconnects the first wall 409 and the second wall 410 at proximal ends thereof, thus defining the U shape. The first wall 409 and the second wall 410 have distal ends opposite from both the proximal ends thereof and the third wall 411.

Figure 25:
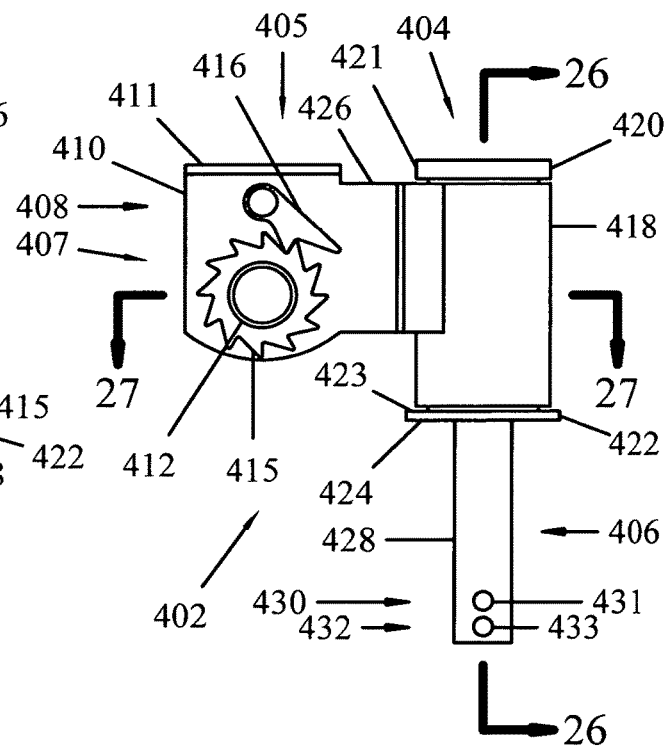
FIG. 25 is a side view of the embodiment of the present invention, as shown in FIG. 24.

The first wall 409 and the second wall 410 each has an aperture therein. Rotatably mounted within the apertures is a spindle 412 having a first end extending beyond the outer surface of the first wall 409, and a second end extending beyond the outer surface of the second wall 410. The strap thereof is removably attachable to the spindle 412, as by engagement slots in the spindle 412, so as to be wound and unwound on the spindle 412. Shown as the hand winch 407, the first end of the spindle 412 has a crank 413 attached thereto, as by welding, adjacent to the outer surface of the first wall 409. The crank 413 and the first end of the spindle 412 have engagement holes 414 for receiving a hand tool (not shown) for rotating the spindle 412. The second end of the spindle 412 has a ratchet 415 attached thereto, as by welding, adjacent to the outer surface of the second wall 410. A pawl 416 is mounted, as on a post, on the outer surface of the second wall 410 to swivel between a locking position engaging with the ratchet 415 to prevent the ratchet 415 and the spindle 412 from unwinding, and as shown in FIG. 25 in the counterclockwise direction relative to the ratchet 415, and an open position whereby the ratchet 415 and the spindle 412 may rotate freely in either direction.

The pivot 404 has a pin 417 and a generally circularly annular sleeve 418 rotatably mounted on the pin 417. The pin 417 is a generally circularly annular tube 419. The annular tube 419 is longer than the rotatable sleeve 418, and has first and second ends and an outer surface interconnecting the first and second ends. A cap 420, as a first cap, is attached, as by welding, to the annular tube 419. The cap 420 is a generally circularly annular ring 421 attached onto the outer surface of the annular tube 419 adjacent to the first end thereof. The ring 421 has a minimum transverse outer dimension, as a diameter as shown, that is equal to or greater than the maximum transverse dimension, as a diameter as shown, of the rotatable sleeve 418.

A base 422, as a second cap, is attached, as by welding, to the annular tube 419 on the second end thereof. The base 422 is a plate. The plate of the base 422 has two opposite side surfaces 423 and 424. The second end of the annular tube 419 is attached centered to the one side surface 423 of the plate of the base 422. The one side surface 423 is thus proximal to the rotatable sleeve 418, and the other, opposite side surface 424 is distal from the rotatable sleeve 418. The plate of the base 422 has transverse dimensions that are unequal transverse width and transverse length, greater than the transverse width, as shown in FIG. 20 and FIG. 23 through FIG. 28. The plate of the base 422 is thus rectangular, with the transverse width thereof defining a first set of sides having one same length and the transverse length thereof defining a second set of sides having one same length such that the lengths of the first set are unequal to the lengths of the second set of the rectangle of the plate of the base 422. The transverse dimensions of the base 422 are greater than the maximum transverse dimension, as a diameter as shown, of the rotatable sleeve 418.

The cap 420 and the base 422 thereby capture the rotatable sleeve 418 onto the pin 417 for the rotatable sleeve 418 to freely rotate on the pin 417 about an axis of rotation. The axis of rotation is aligned with the lengths of both the pin 417 and the rotatable sleeve 418.

A first flange 425 is attached, as by welding, to both the first wall 409 of the right-hand winch 405 and the rotatable sleeve 418 interconnecting the first wall 409 and the rotatable sleeve 418, and a second flange 426 is attached, as by welding, to both the second wall 410 of the right-hand winch 405 and the rotatable sleeve 418 interconnecting the second wall 410 and the rotatable sleeve 418. The one side surface 423 of the base 422 is thus proximal to the right-hand winch 405, and the opposite side surface 424 is distal from the right-hand winch 405. The right-hand winch 405 of the right-hand tie-down 402 is pivotal in either direction about the axis of rotation of the rotatable sleeve 418 of the pivot 404.

Figure 27:
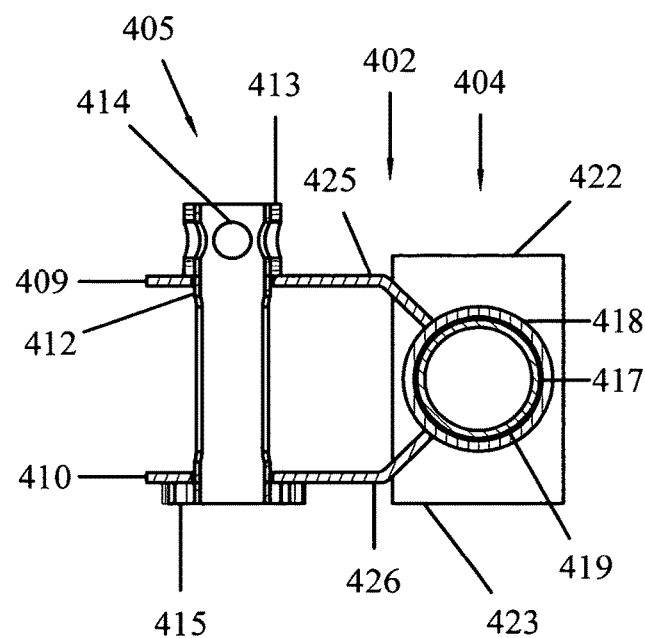
FIG. 27 is a cross-sectional view taken on line 27-27 in FIG. 25.

As shown particularly in FIG. 20, FIG. 25, and FIG. 27, the right-hand winch 405 is clockwise with respect to the one side surface 423 of the base 422. The crank 413 is acutely clockwise from the second wall 410, in that the clockwise angle from the second wall 410 to the crank 413 is acute. The ratchet 415 and the spindle 412 wind in the clockwise direction which the pawl 416 permits when the pawl 416 is in the locking position. When the right-hand winch 405 is pivoting clockwise then the crank 413 is leading and the ratchet 415 is following.

The flanges 425 and 426 space the U-shaped frame 408, and the first wall 409, the second wall 410, and the third wall 411 of the U-shaped frame 408, from the rotatable sleeve 418. The third wall 411 is perpendicular to the rotatable sleeve 418, in that the third wall 411, although spaced from the rotatable sleeve 418, extends by projection radially outwardly away from the axis of rotation of the rotatable sleeve 418 as shown in FIG. 20. The first wall 409 and the second wall 410 extend parallel with the axis of rotation of the rotatable sleeve 418 as shown in FIG. 20. Thus, the U-shaped frame 408 has the U shape thereof opening spaced from the axis of rotation of the rotatable sleeve 418, and parallel with the axis of rotation of the rotatable sleeve 418 in the direction of from the cap 420 to the base 422.

Figure 28:
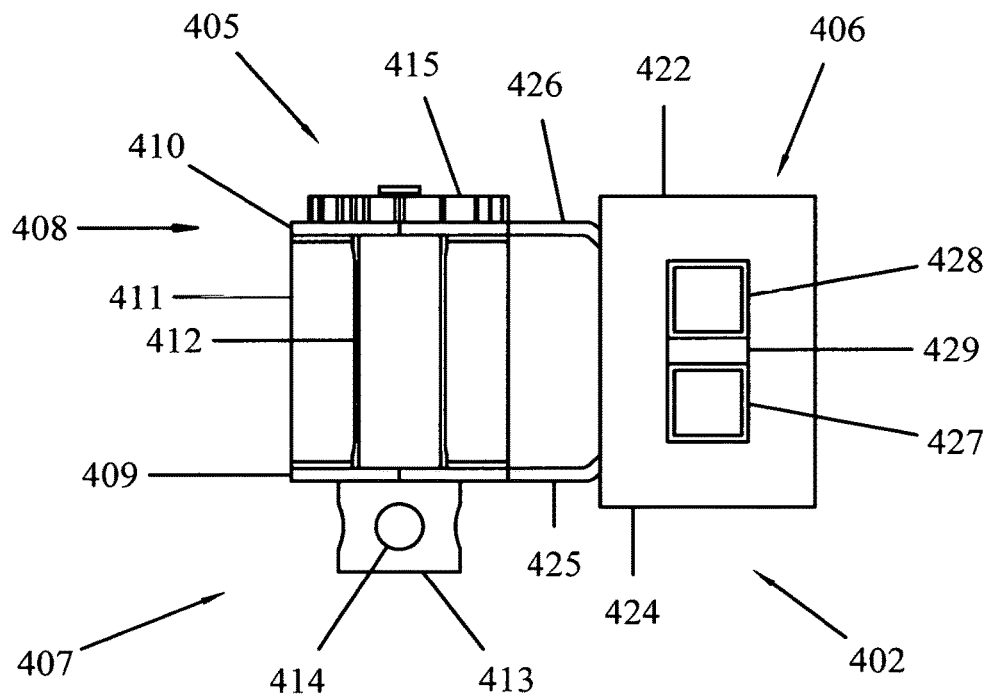
FIG. 28 is a bottom view of the embodiment of the present invention, as shown in FIG. 25.
Figure 24:
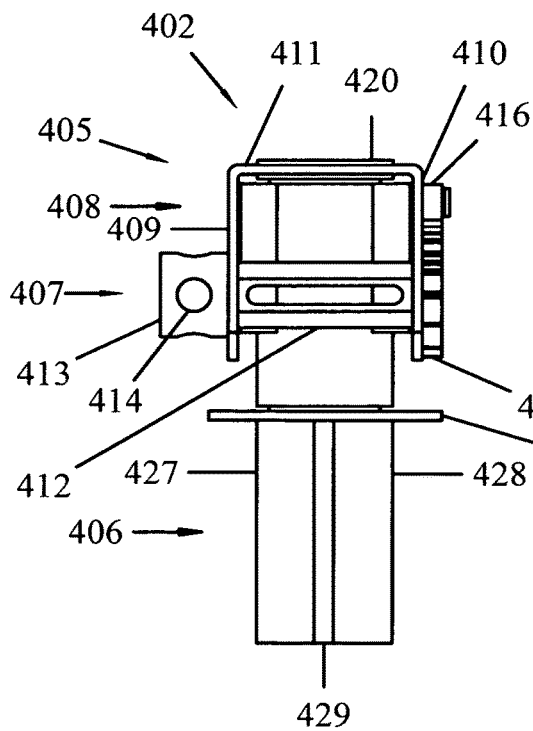
FIG. 24 is a view of the embodiment of the present invention, as shown in FIG. 20, facing the winch of the right-hand tie-down.
Figure 26:
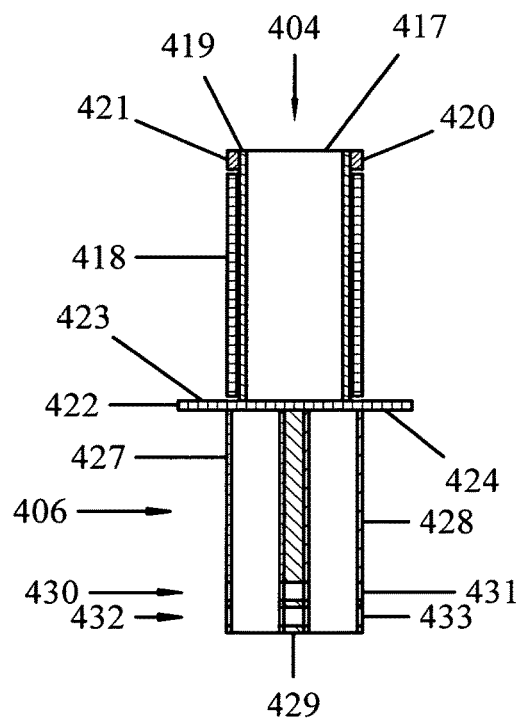
FIG. 26 is a cross-sectional view taken on line 26-26 in FIG. 25.

The anchor 406 has a first generally equilaterally rectangularly annular tube 427 that is transversely cross-sectionally generally square-shaped, and a second generally equilaterally rectangularly annular tube 428 that is transversely cross-sectionally generally square-shaped, and a generally solid bar 429 that is transversely cross-sectionally generally rectangular-shaped. The first annular tube 427 and the second annular tube 428 are parallel with each other as shown in FIG. 26. As shown in FIG. 26 and FIG. 28, the bar 429 is in between the first annular tube 427 and the second annular tube 428 with the first annular tube 427 and the second annular tube 428 sandwiching the bar 429. Facing sides of each of the annular tubes 427 and 428 that face inwardly toward the bar 429 are attached, as by welding, to the bar 429.

The anchor 406 is thus transversely generally rectangular. The anchor 406 has transverse dimensions that are unequal transverse widths, with a second transverse width being greater than a first transverse width as shown in FIG. 28. The anchor 406 has a generally outer surface, first and second ends, and a length defined between the ends. The length and the outer surface of the anchor 406 are sized and shaped to correspond to any one of the stake pockets of the vehicle 40. The length of the anchor 406 preferably is greater than the depth of any one of the stake pockets of the vehicle 40.

As shown in FIG. 28, the transverse width of the rectangular plate of the base 422 is greater than the first transverse width of the anchor 406. The transverse length of the rectangular plate of the base 422 is greater than the second transverse width of the anchor 406. The first end of the anchor 406 is attached, as by welding, to the opposite side surface 424 of the base 422.

The anchor 406 also has a first set 430 of locking holes. The first set 430 of locking holes forms a first aperture 431 passing entirely through the second, greater transverse width of the anchor 406 approximately adjacent but spaced from the second end of the anchor 406. A second set 432 of locking holes forms a second aperture 433, adjacent to the first aperture 431, that passes entirely through the second, greater transverse width of the anchor 406 approximately adjacent but spaced from the second end of the anchor 406. A locking pin 434 may be inserted through either of the apertures 431 or 433 to prevent the right-hand tie-down 402 from being accidentally removed or dislodged from the stake pocket, as stake pocket 42 as shown in FIG. 23, that the right-hand tie-down 402 has been inserted into during the transporting of the load by the vehicle 40. The second aperture 433 may accommodate the locking pin 434 if the first aperture 431 cannot due to a greater depth of the stake pocket into which the right-hand tie-down 402 is inserted, or else due to a shorter length of the anchor 406, such that the first aperture 431 is essentially blocked or otherwise undesirable. A hitch pin as is commonly available may be used as the locking pin 434. A lock 435, as a keyed padlock or any other conventional lock, also may be located on the locking pin 434 to keep the locking pin 434 in place and therefore keep the right-hand tie-down 402 inserted in the stake pocket, as 42, to prevent unauthorized removal of the right-hand tie-down 402.

The anchor 406 is removably mountable within any one of the stake pockets of the vehicle 40, for selectively mounting the right-hand tie-down 402 on the vehicle 40 for securing the load on the support surface 41 for when the vehicle 40 is transporting the load, by inserting the second end of the anchor 406 into the stake pocket, as 42 as shown in FIG. 23. The transverse width and the transverse length of the rectangular plate of the base 422 is greater than the inner dimensions of any one of the stake pockets. The opposite side surface 424 therefore rests on top of the stake pocket into which the anchor 406 of the right-hand tie-down 402 is inserted as shown in FIG. 23. The anchor 406 mounts the right-hand tie-down 402 to the vehicle 40 so that the axis of rotation of the rotatable sleeve 418 is generally perpendicular to the support surface 41 to angularly position the right-hand winch 405 by pivoting the right-hand winch 405 to any plane angle about the axis of rotation relative to the support surface 41, and preferably, when the axis of rotation is generally vertical, that the right-hand winch 405 is pivotal to any angle horizontally.

The left-hand tie-down 403 has, identically as the right-hand tie-down 402 has, a pivot 436, a left-hand winch 437, and an anchor 438, each made of suitable structural material, as metal. The left-hand winch 437 may be a hand winch 439 as shown in FIG. 21 and FIG. 22. The left-hand winch 437 has a generally U-shaped frame 440 comprising a first wall 441, a second wall 442, and a third wall 443. The first wall 441 and the second wall 442 extend from the third wall 443, and the third wall 443 interconnects the first wall 441 and the second wall 442 at proximal ends thereof, thus defining the U shape. Rotatably mounted within apertures in the first wall 441 and the second wall 442 is a spindle 444 having a first end extending beyond the outer surface of the first wall 441, and a second end extending beyond the outer surface of the second wall 442. The strap thereof is removably attachable to the spindle 444, as by engagement slots in the spindle 444, so as to be wound and unwound on the spindle 444. Shown as the hand winch 439, the first end of the spindle 444 has a crank 445 attached thereto, as by welding, adjacent to the outer surface of the first wall 441. The crank 445 and the first end of the spindle 444 have engagement holes for receiving a hand tool (not shown) for rotating the spindle 444. The second end of the spindle 444 has a ratchet 446 attached thereto, as by welding, adjacent to the outer surface of the second wall 442 as shown in FIG. 22. A pawl 447 is mounted, as on a post, on the outer surface of the second wall 442 to swivel between a locking position engaging with the ratchet 446 to prevent the ratchet 446 and the spindle 444 from unwinding, and as shown in FIG. 22 in the clockwise direction relative to the ratchet 446, and an open position whereby the ratchet 446 and the spindle 444 may rotate freely in either direction.

Identically as the pivot 404 of the right-hand tie-down 402, the pivot 436 of the left-hand tie-down 403 has a pin 448 and a generally circularly annular sleeve 449 rotatably mounted on the pin 448. The pin 448 is a generally circularly annular tube. The annular tube is longer than the rotatable sleeve 449, and has first and second ends and an outer surface interconnecting the first and second ends. A cap, as a first cap, is attached, as by welding, to the annular tube. The cap is a generally circularly annular ring 450 attached onto the outer surface of the annular tube adjacent to the first end thereof. The ring 450 has a minimum transverse outer dimension that is equal to or greater than the maximum transverse dimension of the rotatable sleeve 449. A base 451, as a second cap, is attached, as by welding, to the annular tube on the second end thereof. The base 451 is a plate having two opposite side surfaces 452 and 453. The second end of the annular tube is attached centered to the one side surface 452 of the plate of the base 451 as shown in FIG. 21. The one side surface 452 is thus proximal to the rotatable sleeve 449, and the other, opposite side surface 453 is distal from the rotatable sleeve 449. The plate of the base 451 is rectangular, with a first set of sides having one same length and a second set of sides having one same length such that the lengths of the first set are unequal to the lengths of the second set of the rectangle of the plate of the base 451. The lengths of the sides of the rectangle of the base 451 are greater than the maximum transverse dimension of the rotatable sleeve 449. The ring 450 and the base 451 thereby capture the rotatable sleeve 449 onto the pin 448 for the rotatable sleeve 449 to freely rotate on the pin 448 about an axis of rotation. The axis of rotation is aligned with the lengths of both the pin 448 and the rotatable sleeve 449.

A first flange 454 is attached, as by welding, to both the first wall 441 of the left-hand winch 437 and the rotatable sleeve 449 interconnecting the first wall 441 and the rotatable sleeve 449, and a second flange 455 is attached, as by welding, to both the second wall 442 of the left-hand winch 437 and the rotatable sleeve 449 interconnecting the second wall 442 and the rotatable sleeve 449. The one side surface 452 of the base 451 is thus proximal to the left-hand winch 437, and the opposite side surface 453 of the base 451 is distal from the left-hand winch 437. The left-hand winch 437 of the left-hand tie-down 403 is pivotal in either direction about the axis of rotation of the rotatable sleeve 449 of the pivot 436.

As shown particularly in FIG. 21 and FIG. 22, the left-hand winch 437 is counterclockwise with respect to the one side surface 452 of the base 451. The crank 445 is acutely counterclockwise from the second wall 442, in that the counterclockwise angle from the second wall 442 to the crank 445 is acute. The ratchet 446 and the spindle 444 wind in the counterclockwise direction which the pawl 447 of the left-hand winch 437 permits when the pawl 447 is in the locking position. When the left-hand winch 437 is pivoting counterclockwise then the crank 445 is leading and the ratchet 446 is following.

Identically as the right-hand tie-down 402, the flanges 454 and 455 of the left-hand tie-down 403 space the first wall 441, the second wall 442, the third wall 443, and the U-shaped frame 440 from the rotatable sleeve 449. The third wall 443 is perpendicular to the rotatable sleeve 449, in that the third wall 443, although spaced from the rotatable sleeve 449, extends by projection radially outwardly away from the axis of rotation of the rotatable sleeve 449 as shown in FIG. 21 and FIG. 22. The first wall 441 and the second wall 442 extend parallel with the axis of rotation of the rotatable sleeve 449 as shown in FIG. 21 and FIG. 22. Thus, the U-shaped frame 440 has the U shape thereof opening spaced from the axis of rotation of the rotatable sleeve 449, and parallel with the axis of rotation of the rotatable sleeve 449 in the direction of from the ring 450 to the base 451.

Identically as the anchor 406 of the right-hand tie-down 402, the anchor 438 of the left-hand tie-down 403 has a first generally equilaterally rectangularly annular tube 456 that is transversely cross-sectionally generally square-shaped, and a second generally equilaterally rectangularly annular tube 457 that is transversely cross-sectionally generally square-shaped, and a generally solid bar 458 that is transversely cross-sectionally generally rectangular-shaped. The first annular tube 456 and the second annular tube 457 are parallel with each other as shown in FIG. 22. The bar 458 is in between the first annular tube 456 and the second annular tube 457 with the first annular tube 456 and the second annular tube 457 sandwiching the bar 458. Facing sides of each of the annular tubes 456 and 457 that face inwardly toward the bar 458 are attached, as by welding, to the bar 458.

The anchor 438 is thus transversely generally rectangular. The anchor 438 has transverse dimensions that are unequal transverse widths, with a second transverse width being greater than a first transverse width as shown in FIG. 22. The anchor 438 has a generally outer surface, first and second ends, and a length defined between the ends. The length and the outer surface of the anchor 438 are sized and shaped to correspond to any one of the stake pockets of the vehicle 40. The length of the anchor 438 preferably is greater than the depth of any one of the stake pockets of the vehicle 40. As shown in FIG. 22, the transverse width of the rectangular plate of the base 451 is greater than the first transverse width of the anchor 438. The transverse length of the rectangular plate of the base 451 is greater than the second transverse width of the anchor 438. The first end of the anchor 438 is attached, as by welding, to the opposite side surface 453 of the base 451.

The anchor 438 also has a first set 459 of locking holes that forms a first aperture passing entirely through the second, greater transverse width of the anchor 438 approximately adjacent but spaced from the second end of the anchor 438. A second set 460 of locking holes, adjacent to the first set 459 of locking holes, forms a second aperture that passes entirely through the second, greater transverse width of the anchor 438 approximately adjacent but spaced from the second end of the anchor 438. A locking pin may be inserted through either of the apertures to prevent the left-hand tie-down 403 from being accidentally removed or dislodged from the stake pocket that the left-hand tie-down 403 has been inserted into during the transporting of the load by the vehicle 40. A hitch pin as is commonly available may be used as the locking pin. A lock, as a keyed padlock or any other conventional lock, also may be located on the locking pin to keep the locking pin in place and therefore keep the left-hand tie-down 403 inserted in the stake pocket to prevent unauthorized removal of the left-hand tie-down 403.

The anchor 438 of the left-hand tie-down 403, identically as the anchor 406 of the right-hand tie-down 402, is removably mountable within any one of the stake pockets of the vehicle 40, for selectively mounting the left-hand tie-down 403 on the vehicle 40 for securing the load on the support surface 41 for when the vehicle 40 is transporting the load, by inserting the second end of the anchor 438 into that stake pocket. The transverse width and the transverse length of the rectangular plate of the base 451 is greater than the inner dimensions of any one of the stake pockets. The opposite side surface 453 therefore rests on top of the stake pocket into which the anchor 438 of the left-hand tie-down 403 is inserted. The anchor 438 mounts the left-hand tie-down 403 to the vehicle 40 so that the axis of rotation of the rotatable sleeve 449 is generally perpendicular to the support surface 41 to angularly position the left-hand winch 437 by pivoting the left-hand winch 437 to any plane angle about the axis of rotation relative to the support surface 41, and preferably, when the axis of rotation is generally vertical, that the left-hand winch 437 is pivotal to any angle horizontally.

Figure 32:
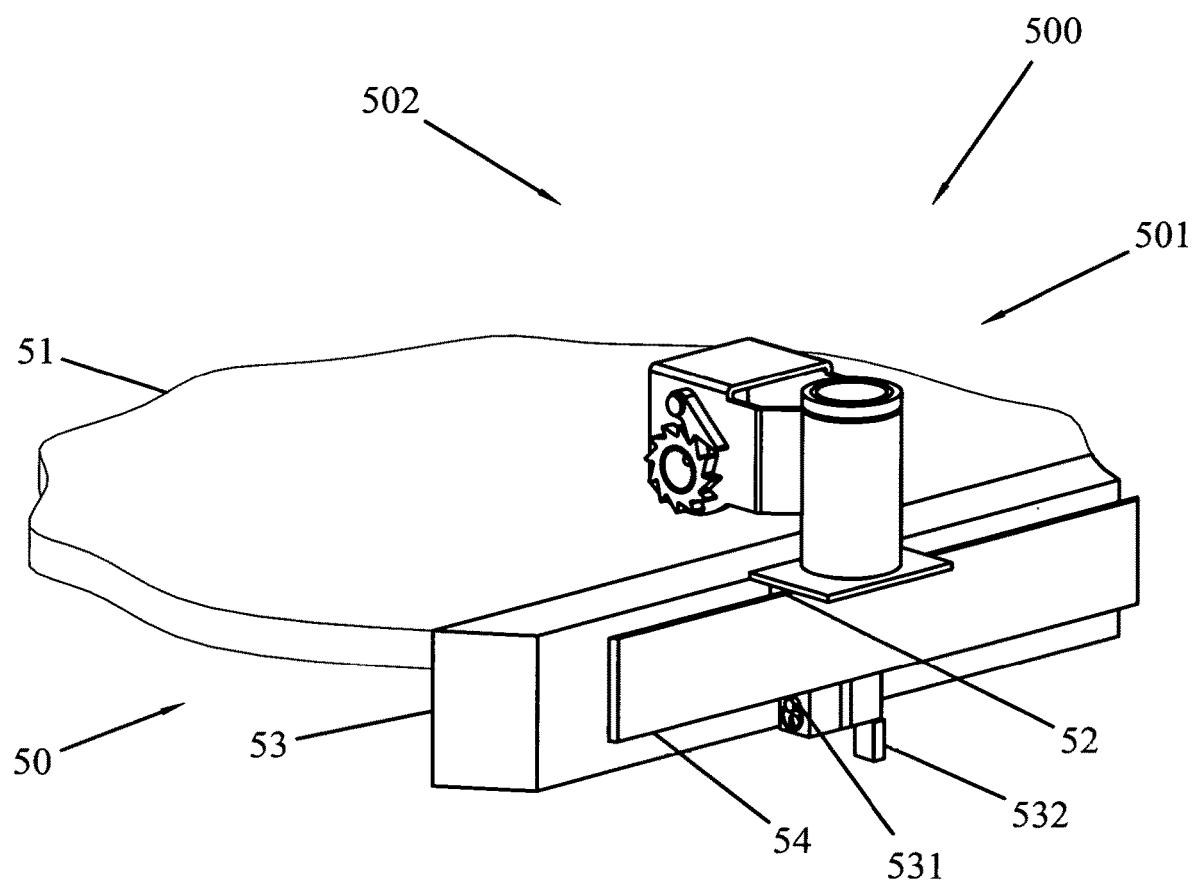
FIG. 32 is a perspective view, partly broken, of the embodiment of the present invention, as shown in FIG. 29, removably mounted in a stake pocket of a vehicle.

Yet still another embodiment of the present invention is shown in FIG. 32 as, generally, a system 500 for securing a load, which may be similar to that shown in FIG. 4, to a vehicle 50 that is for transporting the load. The securing system 500 is generally identical to the securing system 400 as shown in FIG. 20 through FIG. 28 and as described hereinbefore except as shown in FIG. 29 through FIG. 35 and as described hereinafter. Specifically, for each of the left-hand tie-downs and each of the right-hand tie-downs of the securing system 500, the anchor is attached off-centered to the opposite side surface of the plate of the base of the pivot.

In particular, the securing system 500 secures a load to the vehicle 50 that is for transporting generally identically the load as shown in FIG. 4. The vehicle 50 has a support surface 51 for supporting the load when the vehicle 50 is transporting the load. The vehicle 50 further has sets of spaced-apart stake pockets, one stake pocket 52 thereof being shown in FIG. 32, adjacent to the sides, one side 53 being shown in FIG. 32, of the support surface 51. Side rails, one side rail 54 being shown in FIG. 32, are attached to the sets of the stake pockets, respectively, spacing the side rails from the sides of the support surface 51. The sets of the stake pockets are between the side rails and the sides of the support surface 51, respectively. Although FIG. 32 shows a partly broken perspective view of the vehicle 50 with this yet still other embodiment of the present invention, this yet still other embodiment of the present invention is likewise contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

Generally identically as the securing system 400, the securing system 500 comprises a tie-down system 501. The tie-down system 501 comprises a plurality of tie-downs, similarly as the plurality shown in FIG. 4 or as the plurality shown in FIG. 17, that secure the load to the support surface 51 of the vehicle 50. This yet still other embodiment of the present invention is contemplated to be used with any number of the tie-downs of the tie-down system 501 so as to secure the load onto the support surface 51 of the vehicle 50 to prevent the load from unintentionally moving relative to the support surface 51 during the transporting thereof. Each tie-down includes a strap and an attachment, as a hook, respectively, which may be identically as shown in FIG. 4. The straps and the attachments are known in the art. The tie-downs engage the load, as by directly connecting the attachments to the load similarly as shown in FIG. 4, and then secure the load on the support surface 51 by tightening the straps with the tie-downs.

The plurality of the tie-downs of the tie-down system 501 comprises a plurality of left-hand tie-downs and a plurality of right-hand tie-downs, similarly as the plurality shown in FIG. 4 or as the plurality shown in FIG. 17. Each anchor of the left-hand tie-downs and the right-hand tie-downs is attached to the respective base preferably adjacent the proximal side of the respective base, thus transversely spacing apart more widely the left-hand tie-downs and the right-hand tie-downs with respect to the support surface 51 of the vehicle 50 to accommodate wider loads for transporting the wider loads with the vehicle 50. Each left-hand tie-down and each right-hand tie-down is removably mounted to the vehicle 50 by inserting the anchor thereof into one of the stake pockets of the vehicle 50, respectively, so that a person rotating the left-hand tie-downs and the right-hand tie-downs to secure the load on the support surface 51 by tightening the straps thereof is positioned along the sides of the support surface 51 such that the person is always on the left-hand side of any left-hand tie-down and is always on the right-hand side of any right-hand tie-down, similarly as shown in FIG. 4 or as shown in FIG. 17. Although the left-hand tie-downs and the right-hand tie-downs may be removably mounted by inserting the anchor thereof into any stake pocket at any location adjacent the support surface 51 of the vehicle 50, preferably the person is positioned towards the center of the vehicle 50. Therefore, on the right-hand side of the vehicle 50, adjacent to the side rail thereof, one of the left-hand tie-downs is near the front right corner of the support surface 51 of the vehicle 50 and one of the right-hand tie-downs is near the rear right corner of the support surface 51 of the vehicle 50; and, on the left-hand side of the vehicle 50, adjacent the side rail thereof, one of the right-hand tie-downs is near the front left corner of the support surface 51 of the vehicle 50 and one of the left-hand tie-downs is near the rear left corner of the support surface 51 of the vehicle 50. Tie-downs that are next closer towards the center along the sides of the vehicle 50 from the corners of the support surface 51 are likewise left-hand tie-downs or right-hand tie-downs as are the tie-downs nearest the corners. At or near the center along the sides of the vehicle 50, the tie-downs of the tie-down system 501 may be either a left-hand tie-down or a right-hand tie-down.

The right-hand tie-downs of the tie-down system 501 are identical with each other, and the left-hand tie-downs of the tie-down system 501 are identical with each other; and the left-hand tie-downs are generally the same as the right-hand tie-downs except for being left-hand for right-hand as described and shown herein. As such, the right-hand tie-down 502 is typical of the right-hand tie-downs of the tie-down system 501 and is shown in greater detail in FIG. 29 and FIG. 32 through FIG. 35. The left-hand tie-down 503 is typical of the left-hand tie-downs of the tie-down system 501 and is shown in greater detail in FIG. 30 and FIG. 31.

The right-hand tie-down 502 has a pivot 504, a right-hand winch 505, and an anchor 506, each made of suitable structural material, as metal. The right-hand winch 505 may be a hand winch 507 as shown. The right-hand winch 505 has a generally U-shaped frame 508 comprising a first wall 509, a second wall 510, and a third wall 511. The first wall 509 and the second wall 510 extend from the third wall 511, and the third wall 511 interconnects the first wall 509 and the second wall 510 at proximal ends thereof, thus defining the U shape. Rotatably mounted within apertures in the first wall 509 and the second wall 510 is a spindle 512 having a first end extending beyond the outer surface of the first wall 509, and a second end extending beyond the outer surface of the second wall 510. The strap thereof is removably attachable to the spindle 512, as by engagement slots in the spindle 512, so as to be wound and unwound on the spindle 512. Shown as the hand winch 507, the first end of the spindle 512 has a crank 513 attached thereto, as by welding, adjacent to the outer surface of the first wall 509. The crank 513 and the first end of the spindle 512 have engagement holes for receiving a hand tool (not shown) for rotating the spindle 512. The second end of the spindle 512 has a ratchet 514 attached thereto, as by welding, adjacent to the outer surface of the second wall 510. A pawl 515 is mounted, as on a post, on the outer surface of the second wall 510 to swivel between a locking position engaging with the ratchet 514 to prevent the ratchet 514 and the spindle 512 from unwinding, and as shown in FIG. 34 in the counterclockwise direction relative to the ratchet 514, and an open position whereby the ratchet 514 and the spindle 512 may rotate freely in either direction.

The pivot 504 has a pin 516 and a generally circularly annular sleeve 517 rotatably mounted on the pin 516. The pin 516 is a generally circularly annular tube identically as shown in FIG. 26. The annular tube is longer than the rotatable sleeve 517, and has first and second ends and an outer surface interconnecting the first and second ends. A cap, as a first cap, is attached, as by welding, to the annular tube. The cap is a generally circularly annular ring 518 attached onto the outer surface of the annular tube adjacent to the first end thereof. The ring 518 has a minimum transverse outer dimension that is equal to or greater than the maximum transverse dimension of the rotatable sleeve 517. A base 519, as a second cap, is attached, as by welding, to the annular tube on the second end thereof. The base 519 is a plate having two opposite side surfaces 520 and 521. The second end of the annular tube is attached centered to the one side surface 520 of the plate of the base 519. The one side surface 520 is thus proximal to the rotatable sleeve 517, and the other, opposite side surface 521 is distal from the rotatable sleeve 517. The plate of the base 519 has transverse dimensions that are unequal transverse width and transverse length, greater than the transverse width, as shown in FIG. 29 and FIG. 32 through FIG. 35. The plate of the base 519 is thus rectangular, with the transverse width thereof defining a first set of sides having one same length and the transverse length thereof defining a second set of sides, specifically a proximal side 522 and a distal side 523, having one same length such that the lengths of the first set are unequal to the lengths of the second set of the rectangle of the plate of the base 519. The transverse dimensions of the base 519 are greater than the maximum transverse dimension of the rotatable sleeve 517. The ring 518 and the base 519 thereby capture the rotatable sleeve 517 onto the pin 516 for the rotatable sleeve 517 to freely rotate on the pin 516 about an axis of rotation. The axis of rotation is aligned with the lengths of both the pin 516 and the rotatable sleeve 517.

A first flange 524 is attached, as by welding, to both the first wall 509 of the right-hand winch 505 and the rotatable sleeve 517 interconnecting the first wall 509 and the rotatable sleeve 517, and a second flange 525 is attached, as by welding, to both the second wall 510 of the right-hand winch 505 and the rotatable sleeve 517 interconnecting the second wall 510 and the rotatable sleeve 517. The one side surface 520 of the base 519 is thus proximal to the right-hand winch 505, and the opposite side surface 521 is distal from the right-hand winch 505. The right-hand winch 505 of the right-hand tie-down 502 is pivotal in either direction about the axis of rotation of the rotatable sleeve 517 of the pivot 504.

Figures 29, 30, 31:
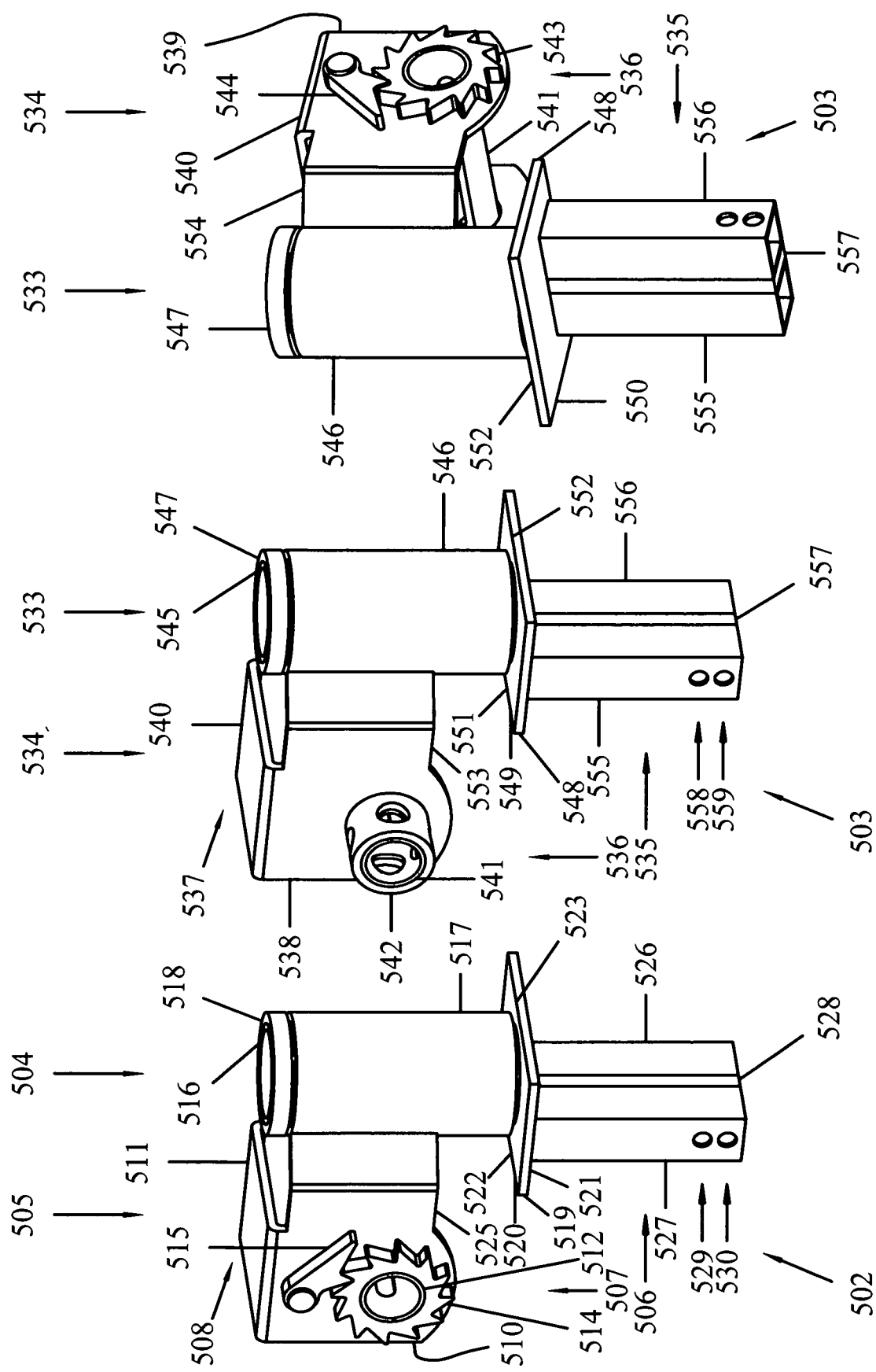
FIG. 29 is a perspective view of yet still another embodiment of the present invention showing a right-hand tie-down thereof.
FIG. 30 is a perspective view of this yet still other embodiment of the present invention showing a left-hand tie-down thereof.
FIG. 31 is another perspective view of the embodiment of the present invention, as shown in FIG. 30.
Figures 33, 34:
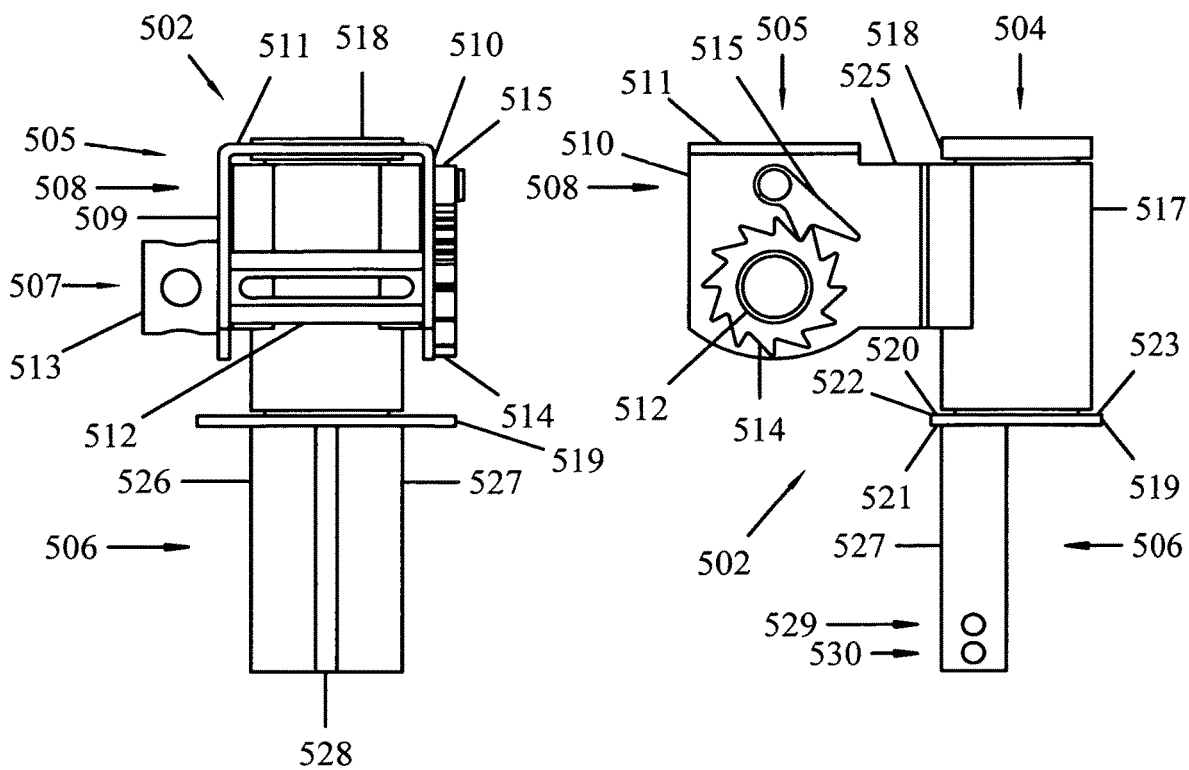
FIG. 33 is a view of the embodiment of the present invention, as shown in FIG. 29, facing the winch of the right-hand tie-down.
FIG. 34 is a side view of the embodiment of the present invention, as shown in FIG. 33.

As shown particularly in FIG. 29, FIG. 33, and FIG. 34, the right-hand winch 505 is clockwise with respect to the one side surface 520 of the base 519. The crank 513 is acutely clockwise from the second wall 510, in that the clockwise angle from the second wall 510 to the crank 513 is acute. The ratchet 514 and the spindle 512 wind in the clockwise direction which the pawl 515 permits when the pawl 515 is in the locking position. When the right-hand winch 505 is pivoting clockwise then the crank 513 is leading and the ratchet 514 is following.

The flanges 524 and 525 of the right-hand tie-down 502 space the first wall 509, the second wall 510, the third wall 511, and the U-shaped frame 508 from the rotatable sleeve 517. The third wall 511 is perpendicular to the rotatable sleeve 517, in that the third wall 511, although spaced from the rotatable sleeve 517, extends by projection radially outwardly away from the axis of rotation of the rotatable sleeve 517 as shown in FIG. 29. The first wall 509 and the second wall 510 extend parallel with the axis of rotation of the rotatable sleeve 517 as shown in FIG. 29. Thus, the U-shaped frame 508 has the U shape thereof opening spaced from the axis of rotation of the rotatable sleeve 517, and parallel with the axis of rotation of the rotatable sleeve 517 in the direction of from the ring 518 to the base 519.

Figure 35:
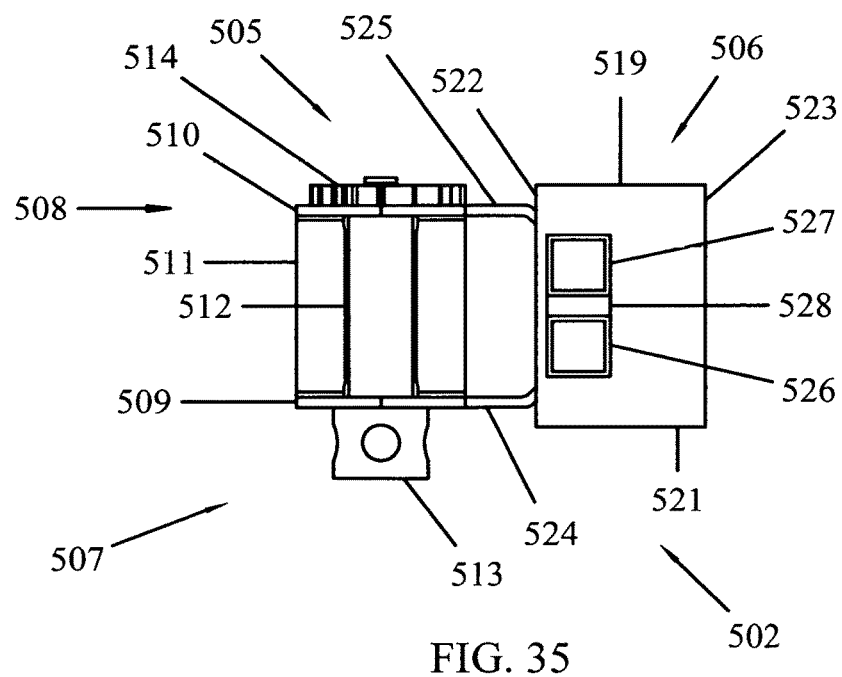
FIG. 35 is a bottom view of the embodiment of the present invention, as shown in FIG. 34.

The anchor 506 has a first generally equilaterally rectangularly annular tube 526 that is transversely cross-sectionally generally square-shaped, and a second generally equilaterally rectangularly annular tube 527 that is transversely cross-sectionally generally square-shaped, and a generally solid bar 528 that is transversely cross-sectionally generally rectangular-shaped. The first annular tube 526 and the second annular tube 527 are parallel with each other as shown in FIG. 33. As shown in FIG. 33 and FIG. 35, the bar 528 is in between the first annular tube 526 and the second annular tube 527 with the first annular tube 526 and the second annular tube 527 sandwiching the bar 528. Facing sides of each of the annular tubes 526 and 527 that face inwardly toward the bar 528 are attached, as by welding, to the bar 528.

The anchor 506 is thus transversely generally rectangular. The anchor 506 has transverse dimensions that are unequal transverse widths, with a second transverse width being greater than a first transverse width as shown in FIG. 35. The anchor 506 has a generally outer surface, first and second ends, and a length defined between the ends. The length and the outer surface of the anchor 506 are sized and shaped to correspond to any one of the stake pockets of the vehicle 50. The length of the anchor 506 preferably is greater than the depth of any one of the stake pockets of the vehicle 50.

As shown in FIG. 35, the transverse width of the rectangular plate of the base 519 is greater than the first transverse width of the anchor 506. The transverse length of the rectangular plate of the base 519 is greater than the second transverse width of the anchor 506. The first end of the anchor 506 is attached off-centered, as by welding, to the opposite side surface 521 of the base 519 and adjacent to the proximal side 522 of the plate of the base 519.

The anchor 506 also has a first set 529 of locking holes that forms a first aperture passing entirely through the second, greater transverse width of the anchor 506 approximately adjacent but spaced from the second end of the anchor 506. A second set 530 of locking holes, adjacent to the first set 529 of locking holes, forms a second aperture that passes entirely through the second, greater transverse width of the anchor 506 approximately adjacent but spaced from the second end of the anchor 506. A locking pin 531 may be inserted through either of the apertures to prevent the right-hand tie-down 502 from being accidentally removed or dislodged from the stake pocket, as stake pocket 52 as shown in FIG. 32, that the right-hand tie-down 502 has been inserted into during the transporting of the load by the vehicle 50. The second aperture may accommodate the locking pin 531 if the first aperture cannot due to a greater depth of the stake pocket into which the right-hand tie-down 502 is inserted, or else due to a shorter length of the anchor 506, such that the first aperture is essentially blocked or otherwise undesirable. A hitch pin as is commonly available may be used as the locking pin 531. A lock 532, as a keyed padlock or any other conventional lock, also may be located on the locking pin 531 to keep the locking pin 531 in place and therefore keep the right-hand tie-down 502 inserted in the stake pocket, as 52, to prevent unauthorized removal of the right-hand tie-down 502.

The anchor 506 is removably mountable within any one of the stake pockets of the vehicle 50, for selectively mounting the right-hand tie-down 502 on the vehicle 50 for securing the load on the support surface 51 for when the vehicle 50 is transporting the load, by inserting the second end of the anchor 506 into the stake pocket, as 52 as shown in FIG. 32. The transverse width and the transverse length of the rectangular plate of the base 519 is greater than the inner dimensions of any one of the stake pockets. The opposite side surface 521 therefore rests on top of the stake pocket into which the anchor 506 of the right-hand tie-down 502 is inserted as shown in FIG. 32. The anchor 506 mounts the right-hand tie-down 502 to the vehicle 50 so that the axis of rotation of the rotatable sleeve 517 is generally perpendicular to the support surface 51 to angularly position the right-hand winch 505 by pivoting the right-hand winch 505 to any plane angle about the axis of rotation relative to the support surface 51, and preferably, when the axis of rotation is generally vertical, that the right-hand winch 505 is pivotal to any angle horizontally.

The left-hand tie-down 503 has, identically as the right-hand tie-down 502 has, a pivot 533, a left-hand winch 534, and an anchor 535, each made of suitable structural material, as metal. The left-hand winch 534 may be a hand winch 536 as shown in FIG. 30 and FIG. 31. The left-hand winch 534 has a generally U-shaped frame 537 comprising a first wall 538, a second wall 539, and a third wall 540. The first wall 538 and the second wall 539 extend from the third wall 540, and the third wall 540 interconnects the first wall 538 and the second wall 539 at proximal ends thereof, thus defining the U shape. Rotatably mounted within apertures in the first wall 538 and the second wall 539 is a spindle 541 having a first end extending beyond the outer surface of the first wall 538, and a second end extending beyond the outer surface of the second wall 539. The strap thereof is removably attachable to the spindle 541, as by engagement slots in the spindle 541, so as to be wound and unwound on the spindle 541. Shown as the hand winch 536, the first end of the spindle 541 has a crank 542 attached thereto, as by welding, adjacent to the outer surface of the first wall 538. The crank 542 and the first end of the spindle 541 have engagement holes for receiving a hand tool (not shown) for rotating the spindle 541. The second end of the spindle 541 has a ratchet 543 attached thereto, as by welding, adjacent to the outer surface of the second wall 539 as shown in FIG. 31. A pawl 544 is mounted, as on a post, on the outer surface of the second wall 539 to swivel between a locking position engaging with the ratchet 543 to prevent the ratchet 543 and the spindle 541 from unwinding, and as shown in FIG. 31 in the clockwise direction relative to the ratchet 543, and an open position whereby the ratchet 543 and the spindle 541 may rotate freely in either direction.

Identically as the pivot 504 of the right-hand tie-down 502, the pivot 533 of the left-hand tie-down 503 has a pin 545 and a generally circularly annular sleeve 546 rotatably mounted on the pin 545. The pin 545 is a generally circularly annular tube. The annular tube is longer than the rotatable sleeve 546, and has first and second ends and an outer surface interconnecting the first and second ends. A cap, as a first cap, is attached, as by welding, to the annular tube. The cap is a generally circularly annular ring 547 attached onto the outer surface of the annular tube adjacent to the first end thereof. The ring 547 has a minimum transverse outer dimension that is equal to or greater than the maximum transverse dimension of the rotatable sleeve 546. A base 548, as a second cap, is attached, as by welding, to the annular tube on the second end thereof. The base 548 is a plate having two opposite side surfaces 549 and 550. The second end of the annular tube is attached centered to the one side surface 549 of the plate of the base 548 as shown in FIG. 30. The one side surface 549 is thus proximal to the rotatable sleeve 546, and the other, opposite side surface 550 is distal from the rotatable sleeve 546. The plate of the base 548 is rectangular, with a first set of sides having one same length and a second set of sides, specifically a proximal side 551 and a distal side 552, having one same length such that the lengths of the first set are unequal to the lengths of the second set of the rectangle of the plate of the base 548. The lengths of the sides of the rectangle of the base 548 are greater than the maximum transverse dimension of the rotatable sleeve 546. The ring 547 and the base 548 thereby capture the rotatable sleeve 546 onto the pin 545 for the rotatable sleeve 546 to freely rotate on the pin 545 about an axis of rotation. The axis of rotation is aligned with the lengths of both the pin 545 and the rotatable sleeve 546.

A first flange 553 is attached, as by welding, to both the first wall 538 of the left-hand winch 534 and the rotatable sleeve 546 interconnecting the first wall 538 and the rotatable sleeve 546, and a second flange 554 is attached, as by welding, to both the second wall 539 of the left-hand winch 534 and the rotatable sleeve 546 interconnecting the second wall 539 and the rotatable sleeve 546. The one side surface 549 of the base 548 is thus proximal to the left-hand winch 534, and the opposite side surface 550 of the base 548 is distal from the left-hand winch 534. The left-hand winch 534 of the left-hand tie-down 503 is pivotal in either direction about the axis of rotation of the rotatable sleeve 546 of the pivot 533.

As shown particularly in FIG. 30 and FIG. 31, the left-hand winch 534 is counterclockwise with respect to the one side surface 549 of the base 548. The crank 542 is acutely counterclockwise from the second wall 539, in that the counterclockwise angle from the second wall 539 to the crank 542 is acute. The ratchet 543 and the spindle 541 wind in the counterclockwise direction which the pawl 544 of the left-hand winch 534 permits when the pawl 544 is in the locking position. When the left-hand winch 534 is pivoting counterclockwise then the crank 542 is leading and the ratchet 543 is following.

Identically as the right-hand tie-down 502, the flanges 553 and 554 of the left-hand tie-down 503 space the first wall 538, the second wall 539, the third wall 540, and the U-shaped frame 537 from the rotatable sleeve 546. The third wall 540 is perpendicular to the rotatable sleeve 546, in that the third wall 540, although spaced from the rotatable sleeve 546, extends by projection radially outwardly away from the axis of rotation of the rotatable sleeve 546 as shown in FIG. 30 and FIG. 31. The first wall 538 and the second wall 539 extend parallel with the axis of rotation of the rotatable sleeve 546 as shown in FIG. 30 and FIG. 31. Thus, the U-shaped frame 537 has the U shape thereof opening spaced from the axis of rotation of the rotatable sleeve 546, and parallel with the axis of rotation of the rotatable sleeve 546 in the direction of from the ring 547 to the base 548.

Identically as the anchor 506 of the right-hand tie-down 502, the anchor 535 of the left-hand tie-down 503 has a first generally equilaterally rectangularly annular tube 555 that is transversely cross-sectionally generally square-shaped, and a second generally equilaterally rectangularly annular tube 556 that is transversely cross-sectionally generally square-shaped, and a generally solid bar 557 that is transversely cross-sectionally generally rectangular-shaped. The first annular tube 555 and the second annular tube 556 are parallel with each other as shown in FIG. 31. The bar 557 is in between the first annular tube 555 and the second annular tube 556 with the first annular tube 555 and the second annular tube 556 sandwiching the bar 557. Facing sides of each of the annular tubes 555 and 556 that face inwardly toward the bar 557 are attached, as by welding, to the bar 557.

The anchor 535 is thus transversely generally rectangular. The anchor 535 has transverse dimensions that are unequal transverse widths, with a second transverse width being greater than a first transverse width as shown in FIG. 31. The anchor 535 has a generally outer surface, first and second ends, and a length defined between the ends. The length and the outer surface of the anchor 535 are sized and shaped to correspond to any one of the stake pockets of the vehicle 50. The length of the anchor 535 preferably is greater than the depth of any one of the stake pockets of the vehicle 50. As shown in FIG. 31, the transverse width of the rectangular plate of the base 548 is greater than the first transverse width of the anchor 535. The transverse length of the rectangular plate of the base 548 is greater than the second transverse width of the anchor 535. The first end of the anchor 535 is attached off-centered, as by welding, to the opposite side surface 550 of the base 548 and adjacent to the proximal side 551 of the plate of the base 548.

The anchor 535 also has a first set 558 of locking holes that forms a first aperture passing entirely through the second, greater transverse width of the anchor 535 approximately adjacent but spaced from the second end of the anchor 535. A second set 559 of locking holes, adjacent to the first set 558 of locking holes, forms a second aperture that passes entirely through the second, greater transverse width of the anchor 535 approximately adjacent but spaced from the second end of the anchor 535. A locking pin may be inserted through either of the apertures to prevent the left-hand tie-down 503 from being accidentally removed or dislodged from the stake pocket that the left-hand tie-down 503 has been inserted into during the transporting of the load by the vehicle 50. A hitch pin as is commonly available may be used as the locking pin. A lock, as a keyed padlock or any other conventional lock, also may be located on the locking pin to keep the locking pin in place and therefore keep the left-hand tie-down 503 inserted in the stake pocket to prevent unauthorized removal of the left-hand tie-down 503.

The anchor 535 of the left-hand tie-down 503, identically as the anchor 506 of the right-hand tie-down 502, is removably mountable within any one of the stake pockets of the vehicle 50, for selectively mounting the left-hand tie-down 503 on the vehicle 50 for securing the load on the support surface 51 for when the vehicle 50 is transporting the load, by inserting the second end of the anchor 535 into that stake pocket. The transverse width and the transverse length of the rectangular plate of the base 548 is greater than the inner dimensions of any one of the stake pockets. The opposite side surface 550 therefore rests on top of the stake pocket into which the anchor 535 of the left-hand tie-down 503 is inserted. The anchor 535 mounts the left-hand tie-down 503 to the vehicle 50 so that the axis of rotation of the rotatable sleeve 546 is generally perpendicular to the support surface 51 to angularly position the left-hand winch 534 by pivoting the left-hand winch 534 to any plane angle about the axis of rotation relative to the support surface 51, and preferably, when the axis of rotation is generally vertical, that the left-hand winch 534 is pivotal to any angle horizontally.

In use of any of the securing system 400 or the securing system 500, either before or after the load is placed on the support surface of the vehicle for transporting the load, as the load on the support surface 41 of the vehicle 40 or the load on the support surface 51 of the vehicle 50, one stake pocket is selected, which may be the stake pocket 42 or the stake pocket 52, and one tie-down of the tie-down system thereof, which may be the left-hand tie-down 403 of the tie-down system 401 for the securing system 400 or the left-hand tie-down 503 of the tie-down system 501 for the securing system 500, is mounted on the vehicle by inserting the second end of the anchor, which may be the anchor 438 of the left-hand tie-down 403 or the anchor 535 of the left-hand tie-down 503, into the one stake pocket. The tie-down is so inserted until the respective base rests on top of the one stake pocket, similarly as shown in FIG. 23 or as shown in FIG. 32, preventing the tie-down from falling all the way through the one stake pocket, respectively. The respective tie-down so mounted can be easily removed for repositioning the respective tie-down into a different stake pocket to engage with the load at a different distance and/or angle to secure the load, or can be removed for storage after completion of the transporting of the load by the vehicle.

After the tie-down is so mounted and after the load is placed on the support surface of the vehicle for transporting the load, respectively, the respective strap, as the strap for the left-hand tie-down 403 or the strap for the left-hand tie-down 503, is connected to and wound, as is known in the art, on the respective spindle (as the spindle 444 or the spindle 541), identically as shown in FIG. 4. Then, keeping the respective pawl, as the pawl 447 or the pawl 544, in its open position, the end of the strap with the attachment is pulled out and away from the respective tie-down, as the left-hand tie-down 403 or the left-hand tie-down 503, allowing the rotatable sleeve of the pivot to freely rotate to angularly position the winch, respectively, as the rotatable sleeve 449, the pivot 436, and the left-hand winch 437 or the rotatable sleeve 546, the pivot 533, and the left-hand winch 534. The attachment is then attached to the desired location on the load when the load is on the support surface, respectively. The respective rotatable sleeve, as the rotatable sleeve 449 or the rotatable sleeve 546, thus rotates such that the respective strap is automatically straight out from the respective spindle, as the spindle 444 or the spindle 541, and perpendicular thereto as being generally perpendicular by perspective therewith, so as to generate a force that is likewise perpendicular for securing the load to the vehicle through the tie-down, respectively, as the left-hand tie-down 403 or the left-hand tie-down 503.

Subsequently, the respective pawl, as the pawl 447 or the pawl 544, is swivelled to its locking position, and the hand tool is inserted (not shown) into the engagement holes of the crank to rotate the spindle to rewind the strap onto the spindle, respectively, as the crank 445 and the spindle 444 or the crank 542 and the spindle 541. For particularly the securing system 500, the anchors of the left-hand tie-downs and the anchors of the right-hand tie-downs of the tie-down system 501 more widely space apart the respective left-hand tie-downs and the respective right-hand tie-downs transversely with respect to the support surface of the respective vehicle to accommodate wider loads for transporting the wider loads with the respective vehicle. Further, the anchors of the left-hand tie-downs and the anchors of the right-hand tie-downs of the tie-down system 501 of the securing system 500 in so transversely spacing apart the respective tie-downs give greater clearance for the hand tool to rotate the respective crank and spindle and reduce interference with the respective vehicle or the components thereof for rotating the hand tool. The pawl engages the ratchet and keeps the spindle from unwinding the strap therefrom, respectively, as the pawl 447, the ratchet 446, and the spindle 444 or the pawl 544, the ratchet 543, and the spindle 541. The strap is thereby tightened to secure the load onto the support surface of the vehicle to prevent the load from unintentionally moving relative to the support surface during the transporting thereof, respectively. Typically, a plurality of the tie-downs, although not necessarily all of the tie-downs, of the tie-down system are used to secure the load, respectively, as the left-hand tie-down 403 and the right-hand tie-down 402 of the tie-down system 401 for the securing system 400 or the left-hand tie-down 503 and the right-hand tie-down 502 of the tie-down system 501 for the securing system 500; in actual use as many or as few of the tie-downs of the respective tie-down system, as the tie-down system 401 or the tie-down system 501, that are needed are used in order to secure the load. The straps thereof are tightened progressively sequentially until the load is fully secured, respectively, so as to meet, for example, force limits, legal requirements, etc. necessary for the transporting of the respective load. Thus each of the securing systems 400 and 500, respectively, with the tie-down systems 401 and 501 thereof, quickly secures the load to the vehicle, while also providing for the selectively mounting of any number of the tie-downs of the tie-down system thereof into the sets of stake pockets, providing secure attachment of the tie-downs of the tie-down system thereof from removal, and providing less waste of production material of the tie-downs of the tie-down system thereof, and also, for the tie-down system 501, providing for wider loads on the vehicle for transporting the wider loads, and providing reduced interference for rotating the hand tool when rewinding the strap onto the respective spindle.

The embodiments of the present invention may be made by any method. Preferably, because hand winches are widely available, a premanufactured hand winch may be the basis for the winch of any of the embodiments of the present invention. Portions of the premanufactured hand winch may be disassembled or cut off, and reassembled or reattached to form the winch of any of the embodiments of the present invention. Preferably, the interconnecting wall of a U-shaped frame of a premanufactured winch may be cut off therefrom and reattached, as by welding, to form the U-shaped frame in accordance with the winch of any of the embodiments of the present invention. This newly made U-shaped frame then is attached to the rotatable sleeve of the pivot of the tie-down in accordance with the present invention.

We claim:

1. A tie-down comprising:
   a pivot comprising:
      a pin,
      a rotatable sleeve on said pin, and
      a base attached to said pin;
   a winch; and
   flanges each attached to both said winch and said sleeve.

2. The tie-down of claim 1, wherein said winch comprises:
   a U-shaped frame comprising:
      a first wall,
      a second wall, and
      a third wall interconnecting said first wall and said second wall; and
   a spindle rotatably mounted on said first wall and said second wall; and
   wherein said third wall is perpendicular to said sleeve.

3. The tie-down of claim 1, wherein said winch comprises:
   a U-shaped frame comprising:
      a first wall,
      a second wall, and
      a third wall interconnecting said first wall and said second wall; and
   a spindle rotatably mounted on said first wall and said second wall; and
   wherein said third wall is spaced from said sleeve.

4. The tie-down of claim 1, wherein said winch comprises:
   a U-shaped frame comprising:
      a first wall,
      a second wall, and
      a third wall interconnecting said first wall and said second wall; and
   a spindle rotatably mounted on said first wall and said second wall; and
   wherein said flanges comprise:
      a first flange interconnecting said first wall and said sleeve, and
      a second flange interconnecting said second wall and said sleeve.

5. The tie-down of claim 1, wherein said base has a first surface and a second surface;
   wherein said pin is attached to said first surface;
   wherein said first surface is proximal to said sleeve;
   wherein said second surface is distal from said sleeve;
   wherein said winch comprises a right-hand winch;
   wherein said right-hand winch comprises:

a frame comprising:
  a first wall, and
  a second wall;
a spindle rotatably mounted on said first wall and said second wall and having a first end and a second end; and
a crank attached to said first end; and
wherein said right-hand winch is clockwise with respect to said first surface with said crank leading.

6. The tie-down of claim 1, wherein said base has a first surface and a second surface;
wherein said pin is attached to said first surface;
wherein said first surface is proximal to said sleeve;
wherein said second surface is distal from said sleeve;
wherein said winch comprises a left-hand winch;
wherein said left-hand winch comprises:
  a frame comprising:
    a first wall, and
    a second wall;
  a spindle rotatably mounted on said first wall and said second wall and having a first end and a second end; and
  a crank attached to said first end; and
wherein said left-hand winch is counterclockwise with respect to said first surface with said crank leading.

7. The tie-down of claim 1, wherein said base has a first surface and a second surface; and
wherein said pin is attached off-centered to said first surface.

8. The tie-down of claim 1, wherein said base has:
a first set of sides each having one same length, and
a second set of sides each having one same length; and
wherein said lengths of said first set are equal to said lengths of said second set.

9. The tie-down of claim 1, wherein said base has:
a first set of sides each having one same length, and
a second set of sides each having one same length; and
wherein said lengths of said first set are unequal to said lengths of said second set.

10. The tie-down of claim 1, wherein said pivot further comprises:
a first cap; and
a second cap; and
wherein:
said pin comprises a generally annular tube;
said tube has a first end and a second end and an outer surface interconnecting said first end and said second end;
said first cap comprises a ring;
said ring is on said outer surface adjacent to said first end;
said second cap is on said second end; and
said second cap comprises a plate.

11. A tie-down comprising:
a base;
a winch connected to said base; and
an anchor attached to said base;
wherein said anchor comprises:
two generally annular tubes parallel to each other; and
a bar; and
wherein said tubes sandwich said bar.

12. The tie-down of claim 11, wherein said base has a first surface and a second surface; and
wherein said anchor is attached off-centered to said second surface.

13. A vehicle for transporting a load comprising:
a support surface for supporting the load when said vehicle is transporting the load; and
a plurality of tie-downs for securing the load on said support surface for when said vehicle is transporting the load;
wherein each respective said tie-down comprises:
a pivot comprising:
  a pin,
  a rotatable sleeve on said pin, and
  a base attached to said pin;
a winch; and
flanges each attached to both said winch and said sleeve.

14. The vehicle of claim 13, wherein each respective said winch comprises:
a U-shaped frame comprising:
  a first wall,
  a second wall, and
  a third wall interconnecting said first wall and said second wall; and
a spindle rotatably mounted on said first wall and said second wall; and
wherein, for each said respective tie-down, said third wall is perpendicular to said sleeve.

15. The vehicle of claim 13, wherein said plurality of said tie-downs comprises at least one left-hand said tie-down and at least one right-hand said tie-down.

16. The vehicle of claim 13, further comprising a plurality of shelves each attached to said vehicle adjacent to said support surface and extending outwardly away from said support surface;
wherein each said respective tie-down is attached to one respective said shelf.

17. The vehicle of claim 13, further comprising:
at least one left-hand shelf attached to said vehicle adjacent to said support surface and extending outwardly away from said support surface; and
at least one right-hand shelf attached to said vehicle adjacent to said support surface and extending outwardly away from said support surface;
wherein one of said tie-downs of said plurality thereof is attached to one of said shelves, respectively.

18. The vehicle of claim 13, further comprising a plurality of shelves for supporting said plurality of said tie-downs, respectively;
wherein each said respective tie-down is attached to one respective said shelf;
wherein each said respective shelf is attached to said vehicle adjacent to said support surface and extends outwardly away from said support surface; and
wherein each said respective shelf comprises:
a generally C-shaped channel attached to said vehicle; and
a gusset interconnecting said channel and said vehicle.

19. The vehicle of claim 13, further comprising a plurality of shelves for supporting said plurality of said tie-downs, respectively;
wherein each said respective tie-down is attached to one respective said shelf;
wherein each said respective shelf is attached to said vehicle adjacent to said support surface and extends outwardly away from said support surface;
wherein each said respective shelf comprises a generally C-shaped channel attached to said vehicle; and
wherein each respective said channel has two sides that are parallel with each other and two other sides that are not parallel with each other.

20. The vehicle of claim 13, further comprising stake pockets adjacent to said support surface;

wherein each said respective tie-down further comprises
an anchor removably mountable within one respective said stake pocket for selectively mounting said tie-down thereof on said vehicle for securing the load on said support surface for when said vehicle is transporting the load; and
wherein, for each said respective tie-down:
said anchor is attached to said base;
said anchor comprises:
two generally annular tubes parallel to each other, and
a bar; and
said tubes sandwich said bar.

21. The vehicle of claim 20, wherein, for each said respective tie-down:
said base has a first surface and a second surface;
said pin is attached to said first surface; and
said anchor is attached off-centered to said second surface.

22. A pivot comprising:
a pin having a first end and a second end and an outer surface interconnecting said first end and said second end;
a rotatable sleeve on said pin in between said first and second ends and having a maximum transverse dimension; and
means for capturing said sleeve onto said pin for said sleeve to be rotatable on said pin;
wherein said capturing means comprises:
a first cap comprising a ring on said outer surface adjacent to said first end and having a minimum transverse dimension at least equal to said maximum transverse dimension; and
a second cap on said second end and having a minimum transverse dimension greater than said maximum transverse dimension.

23. The pivot of claim 22, wherein said pin comprises a generally annular tube.

24. A tie-down comprising:
a pivot comprising:
a pin having a first end and a second end and an outer surface interconnecting said first end and said second end,
a rotatable sleeve on said pin in between said first and second ends,
a first cap comprising a ring, and
a second cap comprising a base; and
a winch;
wherein:
said ring is attached to said pin onto said outer surface adjacent to said first end;
said base is attached to said pin on said second end; and
said winch is connected to said sleeve;
whereby:
said sleeve is captured onto said pin by said first and second caps for said sleeve to be rotatable on said pin; and
said winch is pivotal about said pin by said sleeve being rotatable.

25. The tie-down of claim 24, wherein said pin comprises a generally annular tube.

26. A right-hand tie-down comprising:
a pivot comprising:
a pin,
a rotatable sleeve on said pin, and
a base attached to said pin; and
a winch connected to said sleeve;
wherein said base has a first surface and a second surface;
wherein said pin is attached to said first surface;
wherein said first surface is proximal to said sleeve;
wherein said second surface is distal from said sleeve;
wherein said winch comprises a right-hand winch;
wherein said right-hand winch comprises:
a frame comprising:
a first wall, and
a second wall;
a spindle rotatably mounted on said first wall and said second wall and having a first end and a second end; and
a crank attached to said first end; and
wherein said right-hand winch is clockwise with respect to said first surface with said crank leading.

27. A left-hand tie-down comprising:
a pivot comprising:
a pin,
a rotatable sleeve on said pin, and
a base attached to said pin; and
a winch connected to said sleeve;
wherein said base has a first surface and a second surface;
wherein said pin is attached to said first surface;
wherein said first surface is proximal to said sleeve;
wherein said second surface is distal from said sleeve;
wherein said winch comprises a left-hand winch;
wherein said left-hand winch comprises:
a frame comprising:
a first wall, and
a second wall;
a spindle rotatably mounted on said first wall and said second wall and having a first end and a second end; and
a crank attached to said first end; and
wherein said left-hand winch is counterclockwise with respect to said first surface with said crank leading.

28. A tie-down system comprising:
a plurality of tie-downs;
wherein each respective said tie-down comprises:
a pivot comprising:
a pin,
a rotatable sleeve on said pin, and
a base attached to said pin; and
a winch connected to said sleeve;
wherein, for each said respective tie-down:
said base has a first surface and a second surface;
said pin is attached to said first surface;
said first surface is proximal to said sleeve;
said second surface is distal from said sleeve; and
said winch comprises:
a frame comprising:
a first wall, and
a second wall;
a spindle rotatably mounted on said first wall and said second wall and having a first end and a second end; and
a crank attached to said first end;
wherein said plurality of said tie-downs comprises at least one right-hand said tie-down and at least one left-hand said tie-down;
wherein, for each respective said right-hand tie-down:
said winch is a right-hand winch; and
said right-hand winch is clockwise with respect to said first surface with said crank leading; and
wherein, for each respective said left-hand tie-down:
said winch is a left-hand winch; and said left-hand winch is counterclockwise with respect to said first surface with said crank leading.

29. A vehicle for transporting a load comprising:
a support surface for supporting the load when said vehicle is transporting the load; and
a tie-down system comprising a plurality of tie-downs for securing the load on said support surface for when said vehicle is transporting the load;
wherein each respective said tie-down comprises:
a pivot comprising:
a pin,
a rotatable sleeve on said pin, and
a base attached to said pin; and
a winch connected to said sleeve;
wherein, for each said respective tie-down:
said base has a first surface and a second surface;
said pin is attached to said first surface;
said first surface is proximal to said sleeve;
said second surface is distal from said sleeve; and
said winch comprises:
a frame comprising:
a first wall, and
a second wall;
a spindle rotatably mounted on said first wall and said second wall and having a first end and a second end; and
a crank attached to said first end;
wherein said plurality of said tie-downs comprises at least one right-hand said tie-down and at least one left-hand said tie- down;
wherein, for each respective said right-hand tie-down:
said winch is a right-hand winch; and
said right-hand winch is clockwise with respect to said first surface with said crank leading; and
wherein, for each respective said left-hand tie-down:
said winch is a left-hand winch; and
said left-hand winch is counterclockwise with respect to said first surface with said crank leading.

30. A vehicle for transporting a load comprising:
a support surface for supporting the load when said vehicle is transporting the load; and
a tie-down system comprising a plurality of tie-downs for securing the load on said support surface for when said vehicle is transporting the load;
wherein said plurality of said tie-downs comprises at least one right-hand said tie-down and at least one left-hand said tie- down;
wherein said support surface has a front right corner and a rear right corner;
wherein said one left-hand tie-down is near said front right corner; and
wherein said one right-hand tie-down is near said rear right corner.

31. The vehicle of claim 30, wherein said support surface further has a front left corner and a rear left corner;
wherein said plurality of said tie-downs further comprises at least another right-hand said tie-down and at least another left-hand said tie-down;
wherein said other right-hand tie-down is near said front left corner; and
wherein said other left-hand tie-down is near said rear left corner.

32. The vehicle of claim 30, further comprising a shelf system comprising a plurality of shelves;
wherein each respective said shelf comprises a channel having a surface;
wherein each said respective shelf is attached to said vehicle adjacent to said support surface; and
wherein one of said tie-downs of said plurality thereof is attached to, and supported on said surface of, one of said shelves, respectively.

33. The vehicle of claim 32, wherein said plurality of said shelves comprises at least one right-hand said shelf and at least one left-hand said shelf;
wherein said one left-hand shelf is near said front right corner;
wherein said one left-hand tie-down is attached to, and supported on said surface of, said one left-hand shelf near said front right corner;
wherein said one right-hand shelf is near said rear right corner; and
wherein said one right-hand tie-down is attached to, and supported on said surface of, said one right-hand shelf near said rear right corner.

34. The vehicle of claim 33, wherein said support surface further has a front left corner and a rear left corner;
wherein said plurality of said tie-downs further comprises at least another right-hand said tie-down and at least another left-hand said tie-down;
wherein said plurality of said shelves further comprises at least another right-hand said shelf and at least another left- hand said shelf;
wherein said other right-hand shelf is near said front left corner;
wherein said other right-hand tie-down is attached to, and supported on said surface of, said other right-hand shelf near said front left corner;
wherein said other left-hand shelf is near said rear left corner; and
wherein said other left-hand tie-down is attached to, and supported on said surface of, said other left-hand shelf near said rear left corner.

35. The vehicle of claim 30, further comprising stake pockets adjacent to said support surface;
wherein each respective said tie-down of said plurality thereof comprises an anchor; and
wherein said anchor of one said respective tie-down is removably mountable within one said stake pocket, respectively, for selectively mounting at least one of said tie-downs of said plurality thereof on said vehicle for securing the load on said support surface for when said vehicle is transporting the load.

36. The vehicle of claim 35, wherein said support surface further has a front left corner and a rear left corner;
wherein said plurality of said tie-downs further comprises at least another right-hand said tie-down and at least another left-hand said tie-down;
wherein said other right-hand tie-down is near said front left corner; and
wherein said other left-hand tie-down is near said rear left corner.

37. The vehicle of claim 35, wherein, for each said respective tie-down, said anchor comprises a set of locking holes.

38. The vehicle of claim 37, wherein each said respective tie-down further comprises a locking pin removably insertable into said set of said locking holes.

39. The vehicle of claim 37, wherein, for each said respective tie-down, said anchor further comprises another set of locking holes.

40. The vehicle of claim 39, wherein each said respective tie-down further comprises a locking pin removably insertable into one of said sets of said locking holes.

* * * * *

UNITED STATES PATENT AND TRADEMARK OFFICE
CERTIFICATE OF CORRECTION

PATENT NO. : 12,077,088 B2
APPLICATION NO. : 16/873593
DATED : September 3, 2024
INVENTOR(S) : Maners et al.

Page 1 of 1

It is certified that error appears in the above-identified patent and that said Letters Patent is hereby corrected as shown below:

In the Specification

Column 21, Line 34, "wall 349"extend" should read --wall 349 extend--.
Column 24, Line 35, "systems, thereof, quickly" should read --systems thereof, quickly--.

Signed and Sealed this
Twenty-ninth Day of July, 2025

Coke Morgan Stewart
*Acting Director of the United States Patent and Trademark Office*